(12) United States Patent
Mizoguchi

(10) Patent No.: US 11,048,077 B2
(45) Date of Patent: Jun. 29, 2021

(54) OPTICAL SCANNER, METHOD FOR MANUFACTURING OPTICAL SCANNER, IMAGE DISPLAY DEVICE, HEAD-MOUNTED DISPLAY, AND HEAD-UP DISPLAY

(71) Applicant: SEIKO EPSON CORPORATION, Tokyo (JP)

(72) Inventor: Yasushi Mizoguchi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 467 days.

(21) Appl. No.: 15/698,029

(22) Filed: Sep. 7, 2017

(65) Prior Publication Data
US 2018/0095271 A1 Apr. 5, 2018

(30) Foreign Application Priority Data
Sep. 30, 2016 (JP) .............................. JP2016-192978

(51) Int. Cl.
*G03H 1/00* (2006.01)
*G02B 26/10* (2006.01)
*G02B 27/01* (2006.01)
*G02B 26/08* (2006.01)

(52) U.S. Cl.
CPC ......... *G02B 26/105* (2013.01); *G02B 26/085* (2013.01); *G02B 27/0149* (2013.01); *G02B 27/0176* (2013.01)

(58) Field of Classification Search
CPC ........ G02B 26/00; G02B 26/02; G02B 26/08; G02B 26/0816; G02B 26/0833; G02B 26/105; G02B 26/085; G02B 26/0841; G02B 26/10; G02B 26/101; G02B 27/01; G02B 27/017; G02B 27/0149; G02B 27/0176; Y10T 29/49002; H01F 2007/068
USPC .... 359/13, 23, 26, 27, 29–33, 48–54, 64–68
See application file for complete search history.

(56) References Cited

U.S. PATENT DOCUMENTS

| | | | |
|---|---|---|---|
| 5,912,608 A | 6/1999 | Asada | |
| 2007/0165096 A1* | 7/2007 | Nakamura | ......... G02B 26/0833 347/225 |
| 2008/0218823 A1 | 9/2008 | Mizoguchi | |

(Continued)

FOREIGN PATENT DOCUMENTS

| | | |
|---|---|---|
| JP | H08-322227 A | 12/1996 |
| JP | 2003-270555 A | 9/2003 |

(Continued)

*Primary Examiner* — Stephone B Allen
*Assistant Examiner* — Jyotsna V Dabbi
(74) *Attorney, Agent, or Firm* — Oliff PLC

(57) ABSTRACT

An optical scanner including a first movable portion provided with a light reflecting portion, a second movable portion in which the first movable portion is positioned on an inner side, a first axis portion that connects the first movable portion and the second movable portion to one another and oscillatably supports the first movable portion around a first axis, a second axis portion that is connected to the second movable portion and oscillatably supports the second movable portion around a second axis that intersects the first axis, and an elastic portion provided in the second axis portion, in which the second axis portion has a hole and the elastic portion is disposed in the hole.

20 Claims, 26 Drawing Sheets

(56) References Cited

U.S. PATENT DOCUMENTS

| | | | | |
|---|---|---|---|---|
| 2010/0080609 A1* | 4/2010 | Yoshino | ............... | G03G 5/0698 |
| | | | | 399/111 |
| 2012/0120470 A1* | 5/2012 | Kitazawa | .............. | F21S 41/675 |
| | | | | 359/200.1 |
| 2013/0140591 A1* | 6/2013 | Tseng | .................... | H01L 33/504 |
| | | | | 257/98 |
| 2014/0310914 A1* | 10/2014 | Erlich | ................. | B81C 1/00523 |
| | | | | 16/225 |
| 2015/0009236 A1* | 1/2015 | Saito | ................... | G02B 27/017 |
| | | | | 345/656 |
| 2015/0248008 A1 | 9/2015 | Hino et al. | | |
| 2015/0277109 A1 | 10/2015 | Mizoguchi | | |
| 2017/0052366 A1 | 2/2017 | Yamano et al. | | |

FOREIGN PATENT DOCUMENTS

| | | | | |
|---|---|---|---|---|
| JP | 2008-216920 A | | 9/2008 | |
| JP | 2013-097044 A | | 5/2013 | |
| JP | 2015-161878 A | | 9/2015 | |
| JP | 2015-184596 A | | 10/2015 | |
| JP | 2016085299 A | * | 5/2016 | ........... G02B 26/101 |
| JP | 2017-040700 A | | 2/2017 | |

\* cited by examiner

OPTICAL SCANNER, METHOD FOR MANUFACTURING OPTICAL SCANNER, IMAGE DISPLAY DEVICE, HEAD-MOUNTED DISPLAY, AND HEAD-UP DISPLAY

BACKGROUND

1. Technical Field

The present invention relates to an optical scanner, a method for manufacturing an optical scanner, an image display device, a head-mounted display, and a head-up display.

2. Related Art

For example, JP-A-2008-216920 discloses a gimbal type optical scanner. Such an optical scanner has a first movable portion having a light reflecting portion, a frame form second movable portion in which the first movable portion is positioned on an inner side, a first axis portion that connects the first movable portion and the second movable portion to one another, and that oscillatably supports the first movable portion around a first axis, a second axis portion that oscillatably supports the second movable portion around a second axis that intersects the first axis, and a permanent magnet provided in the second movable portion so as to be inclined relative to both axes of the first axis and the second axis. Further, when a magnetic field is caused to act on the permanent magnet, the second movable portion oscillates around the second axis in non-resonance and the first movable portion oscillates around the first axis in resonance, and as a result of this, the first movable portion oscillates around both axes of the first axis and the second axis.

However, in an optical scanner having such a configuration, the second movable portion has a frame form and the mass thereof is large, and the permanent magnet is provided in the second movable portion, and thus the moment of inertia of the second movable portion is large. When the moment of inertia increases, the Q value of resonance vibrations (a value that represents the ease with which resonance vibrations occur, resonance is more likely to take place as the Q value increases) increases, and therefore, there is a concern that the vibrations of resonance will overlap in the second movable portion, which should be caused to oscillate in non-resonance. As a result of this, there is a possibility that the oscillation characteristics of the optical scanner will deteriorate.

SUMMARY

An advantage of some aspects of the invention is to provide an optical scanner capable of exhibiting excellent oscillation characteristics, and to provide an image display device, a head-mounted display, and a head-up display provided with the optical scanner and having high reliability.

The advantage can be achieved by the following invention.

According to an aspect of the invention, there is provided an optical scanner including a first movable portion provided with a light reflecting portion that has a light reflecting property, a second movable portion in which the first movable portion is positioned on an inner side, a first axis portion that connects the first movable portion and the second movable portion to one another and oscillatably supports the first movable portion around a first axis, a second axis portion that is connected to the second movable portion and oscillatably supports the second movable portion around a second axis that intersects the first axis, and an elastic portion provided in the second axis portion, in which the second axis portion has a hole and the elastic portion is disposed in the hole.

In this case, it is possible to absorb and alleviate unnecessary vibrations of the second movable portion by using the elastic portion. Therefore, it is possible to achieve an optical scanner capable of exhibiting excellent oscillation characteristics.

In the optical scanner according to the aspect of the invention, it is preferable that the hole be a through-hole or a bottomed-hole.

In this case, disposition of the elastic portion is facilitated.

In the optical scanner according to the aspect of the invention, it is preferable that the Young's modulus of the elastic portion be less than the Young's modulus of the second axis portion.

In this case, it is possible to effectively absorb and alleviate unnecessary vibrations of the second movable portion by using the elastic portion.

In the optical scanner according to the aspect of the invention, it is preferable that the Young's modulus of the elastic portion be 10 MPa to 100 MPa.

In this case, it is possible to more effectively absorb and alleviate unnecessary vibrations of the second movable portion by using the elastic portion.

In the optical scanner according to the aspect of the invention, it is preferable that a constituent material of the elastic portion include silicone.

In this case, the configuration of the elastic portion is simple.

In the optical scanner according to the aspect of the invention, it is preferable that the second axis portion have a pair of movable beam portions, and the pair of movable beam portions each have a plurality of the holes that are disposed along the second axis.

In this case, it is possible to prevent a circumstance in which one hole is too large. Therefore, it is possible to suppress a deterioration in the mechanical strength of the second axis portion.

In the optical scanner according to the aspect of the invention, it is preferable that the first movable portion oscillate in resonance around the first axis, and the second movable portion oscillate in non-resonance around the second axis.

In this case, it is possible to cause the first movable portion to oscillate around the first axis at a large oscillation angle and it is possible to cause the first movable portion to oscillate around the second axis with a desired waveform.

According to another aspect of the invention, there is provided an image display device including the optical scanner according to the aspect of the invention.

In this case, it is possible to benefit from the effect of the optical scanner, and therefore, an image display device having high reliability is obtained.

According to still another aspect of the invention, there is provided a head-mounted display including the optical scanner according to the aspect of the invention and a frame equipped with the optical scanner and worn on a head portion of an observer.

In this case, it is possible to benefit from the effect of the optical scanner, and therefore, a head-mounted display having high reliability is obtained.

According to still another aspect of the invention, there is provided a head-up display including the optical scanner according to the aspect of the invention.

In this case, it is possible to benefit from the effect of the optical scanner, and therefore, a head-up display having high reliability is obtained.

According to still another aspect of the invention, there is provided a method for manufacturing an optical scanner having a first movable portion provided with a light reflecting portion that has a light reflecting property, a second movable portion in which the first movable portion is positioned on an inner side, a first axis portion that connects the first movable portion and the second movable portion to one another and oscillatably supports the first movable portion around a first axis, a second axis portion that is connected to the second movable portion and oscillatably supports the second movable portion around a second axis that intersects the first axis, and an elastic portion provided in a hole of the second axis portion, the method including forming a structural body that includes the first movable portion, the second movable portion, the first axis portion, the second axis portion, and the hole, forming the light reflecting portion, and coating the structural body with a constituent material of the elastic portion via a mask having an opening portion that corresponds to the hole by using a spray coating technique.

In this case, it is possible to manufacture an optical scanner capable of absorbing and alleviating unnecessary vibrations of the second movable portion by using the elastic portion.

In the method for manufacturing an optical scanner according to the aspect of the invention, it is preferable that the opening portion of the mask be an opening that corresponds to at least a section of the second axis portion and the second movable portion, and the constituent material include a black pigment.

In this case, at least a section of the second axis portion and the second movable portion is covered by a black constituent material having a low reflectance. Accordingly, it is possible to manufacture an optical scanner in which a circumstance in which light that is incident to the second axis portion and the second movable portion is reflected by the second axis portion and the second movable portion and becomes stray light is suppressed.

In the method for manufacturing an optical scanner according to the aspect of the invention, it is preferable that the structural body be heated in the coating.

In this case, since the constituent material of the elastic portion with which the structural body is coated is deposited in granule form as a result of heating the structural body, light that is incident to the second axis portion and the second movable portion is reflected as scattered light and is attenuated. Accordingly, it is possible to manufacture an optical scanner in which a circumstance in which light that is incident to the second axis portion and the second movable portion is reflected by the second axis portion and the second movable portion and becomes stray light is further suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an optical scanner, an image display device, a head-mounted display, and a head-up display will be described with reference to the appended drawings.

First Embodiment

Figure 1:
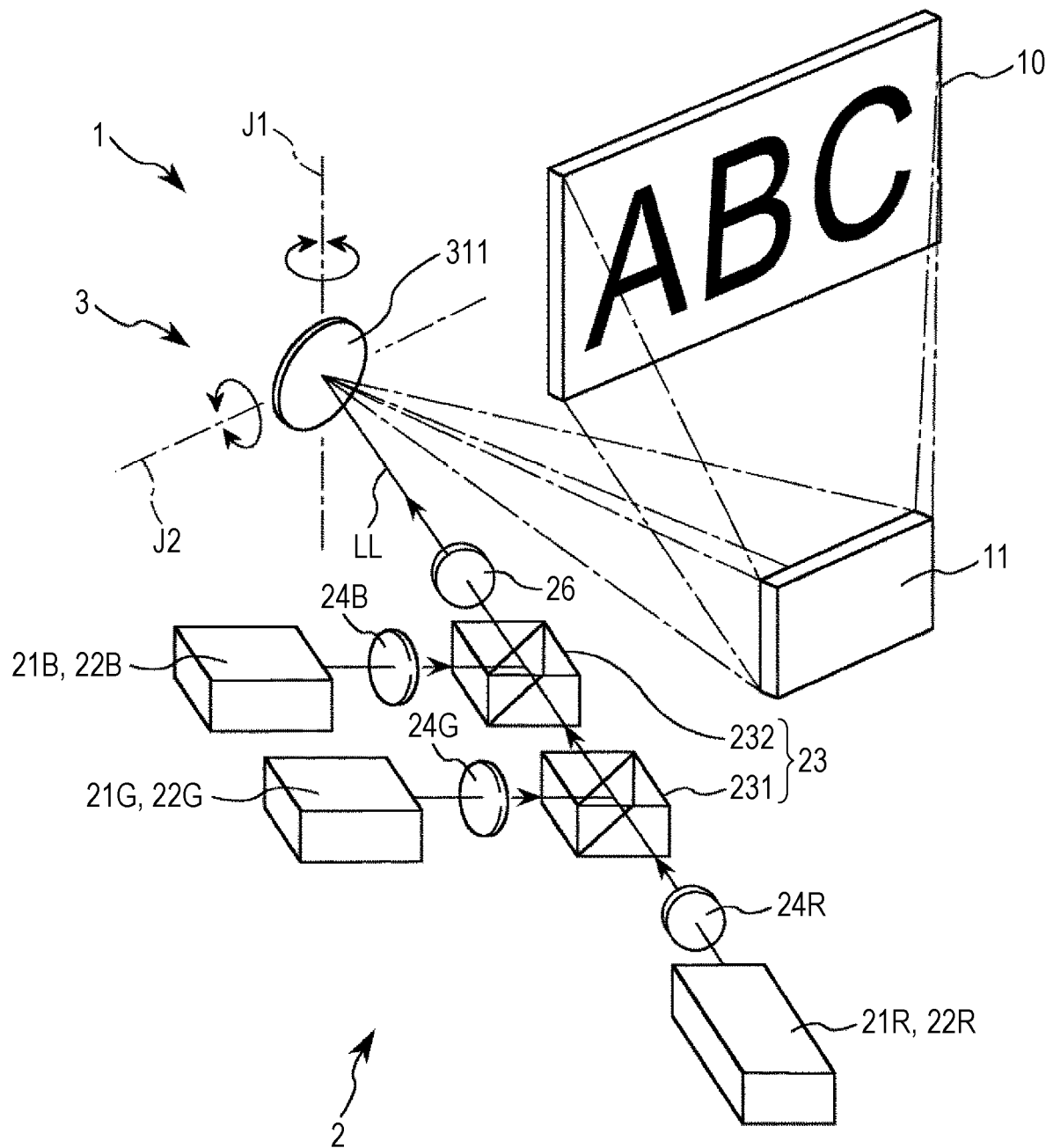
FIG. 1 is a configuration view of an image display device according to a first embodiment.
Figure 2:
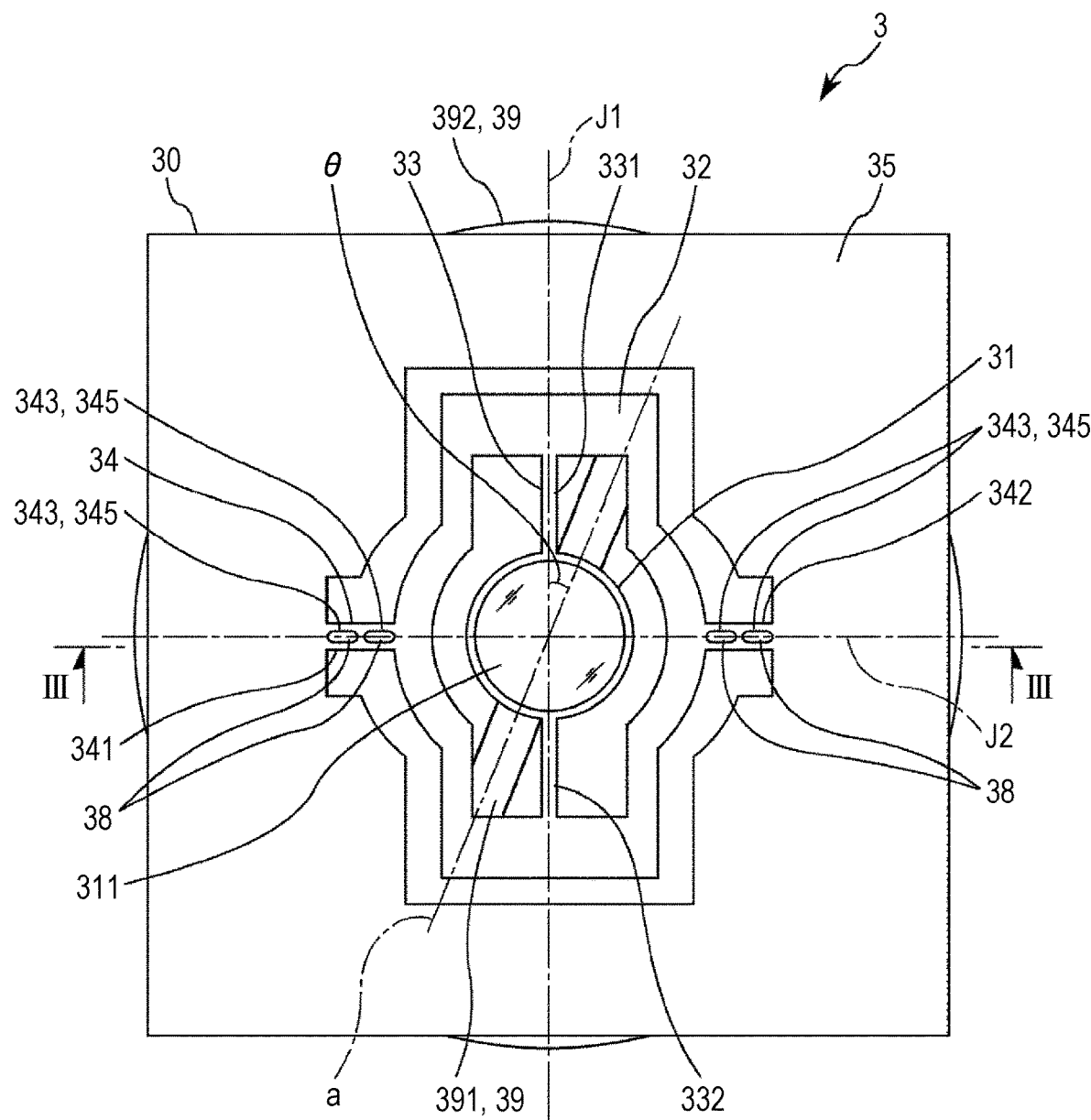
FIG. 2 is a plan view of an optical scanner included in the image display device shown in FIG. 1.
Figure 3:
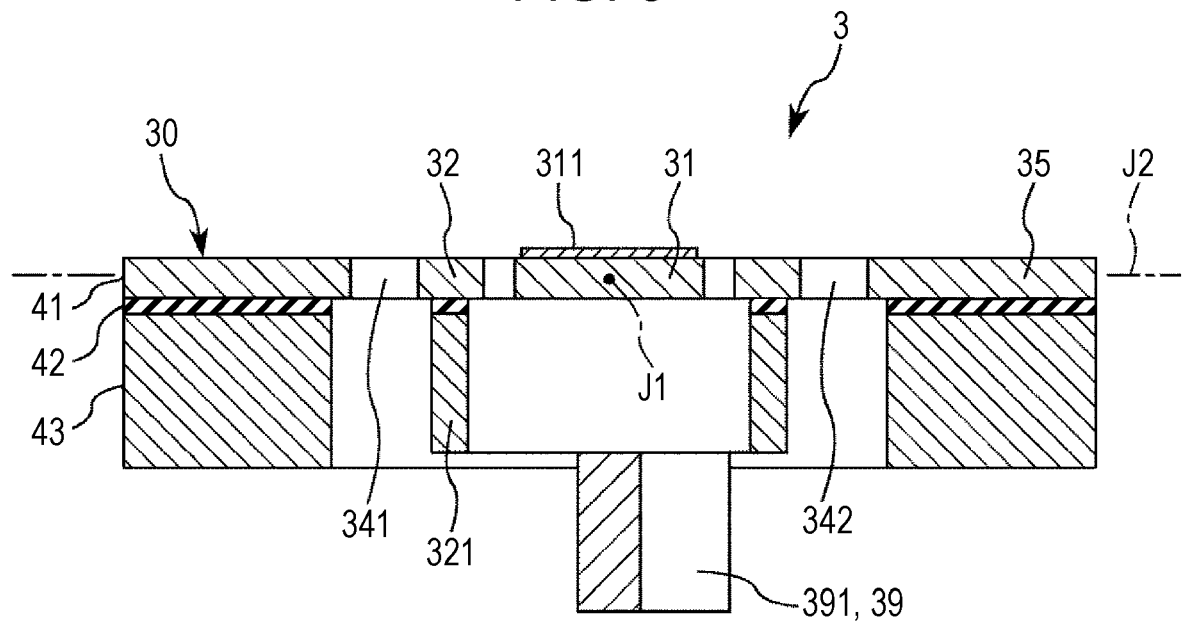
FIG. 3 is a cross-sectional view taken along line III-III in FIG. 2.
Figure 3:
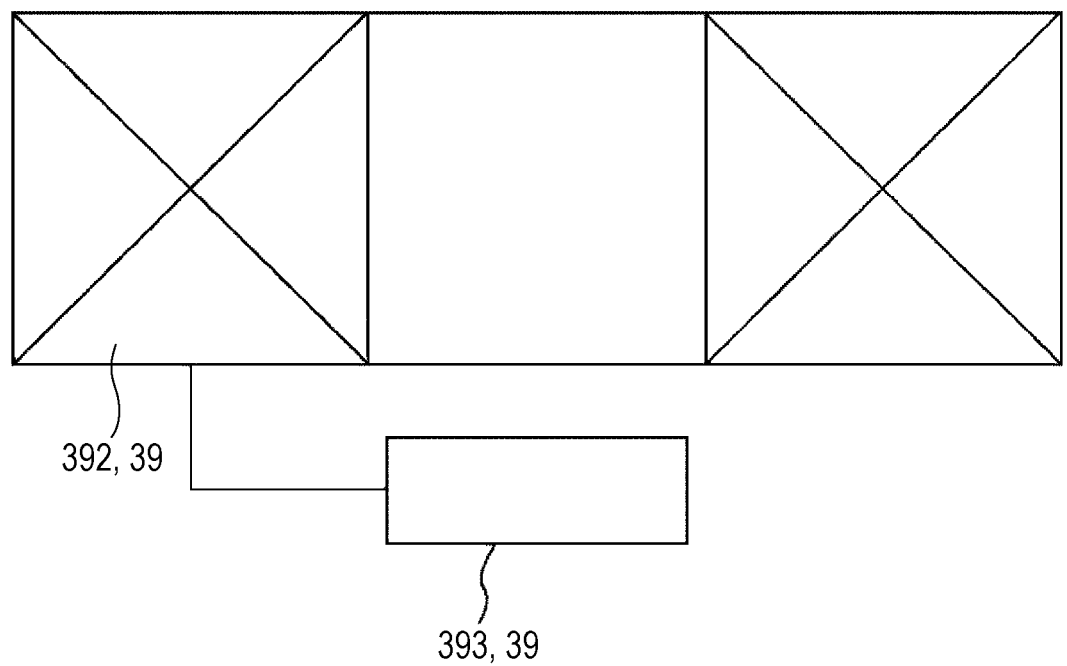
Figure 4:
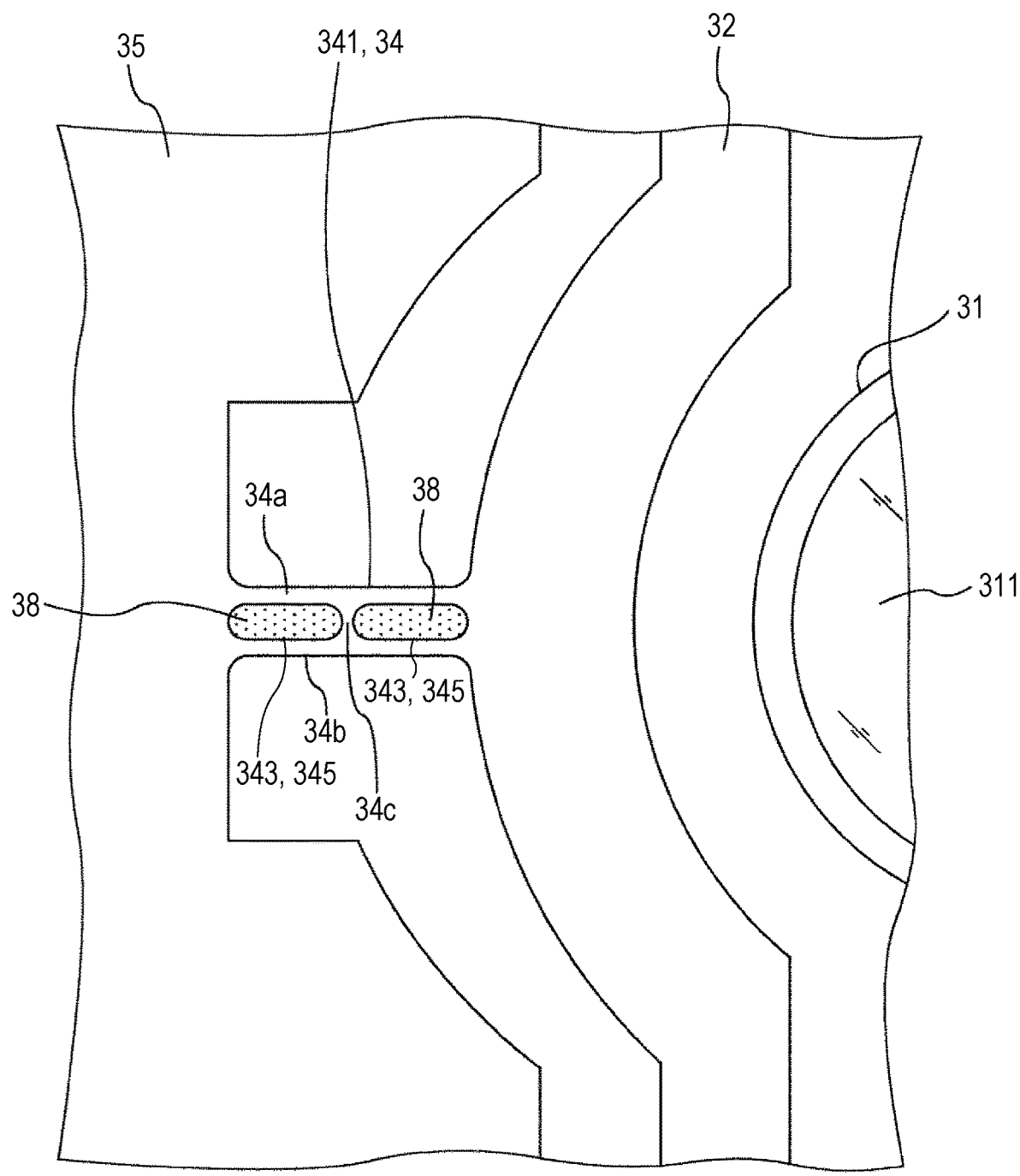
FIG. 4 is a plan view of a second axis portion included in the optical scanner shown in FIG. 2.
Figure 5:
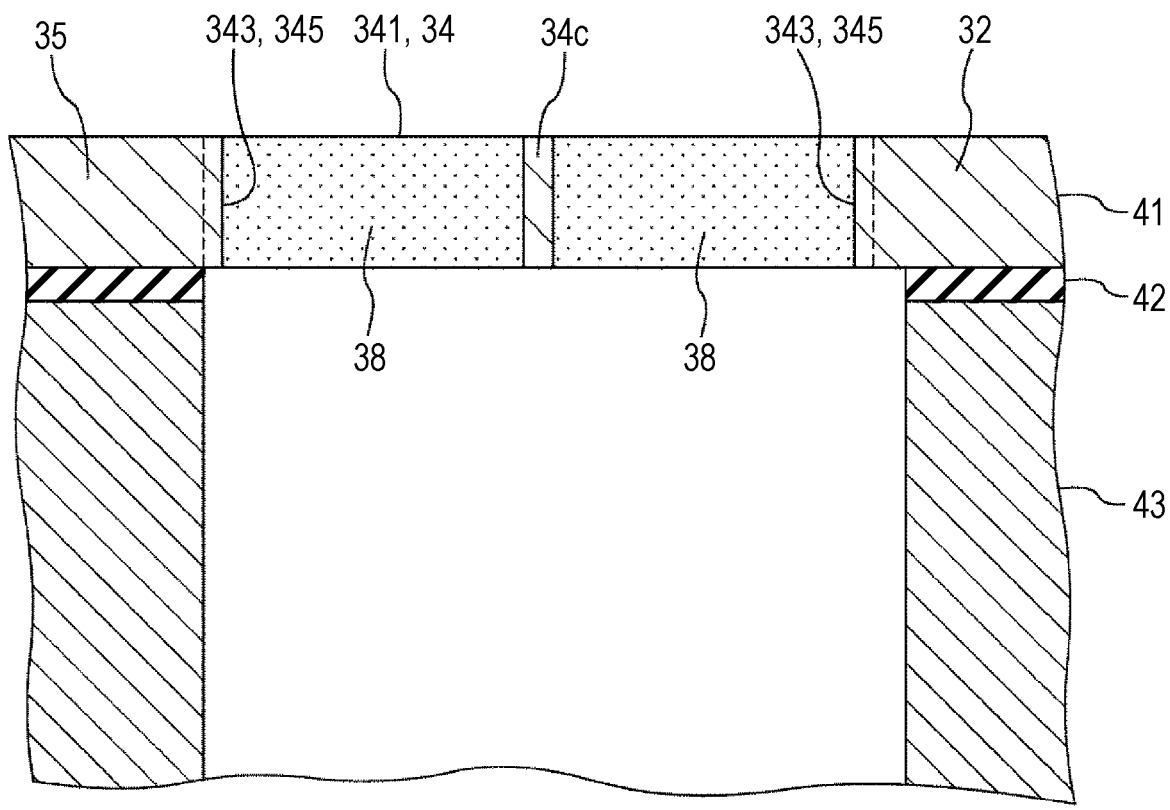
FIG. 5 is a cross-sectional view of the second axis portion shown in FIG. 4.
Figure 6:
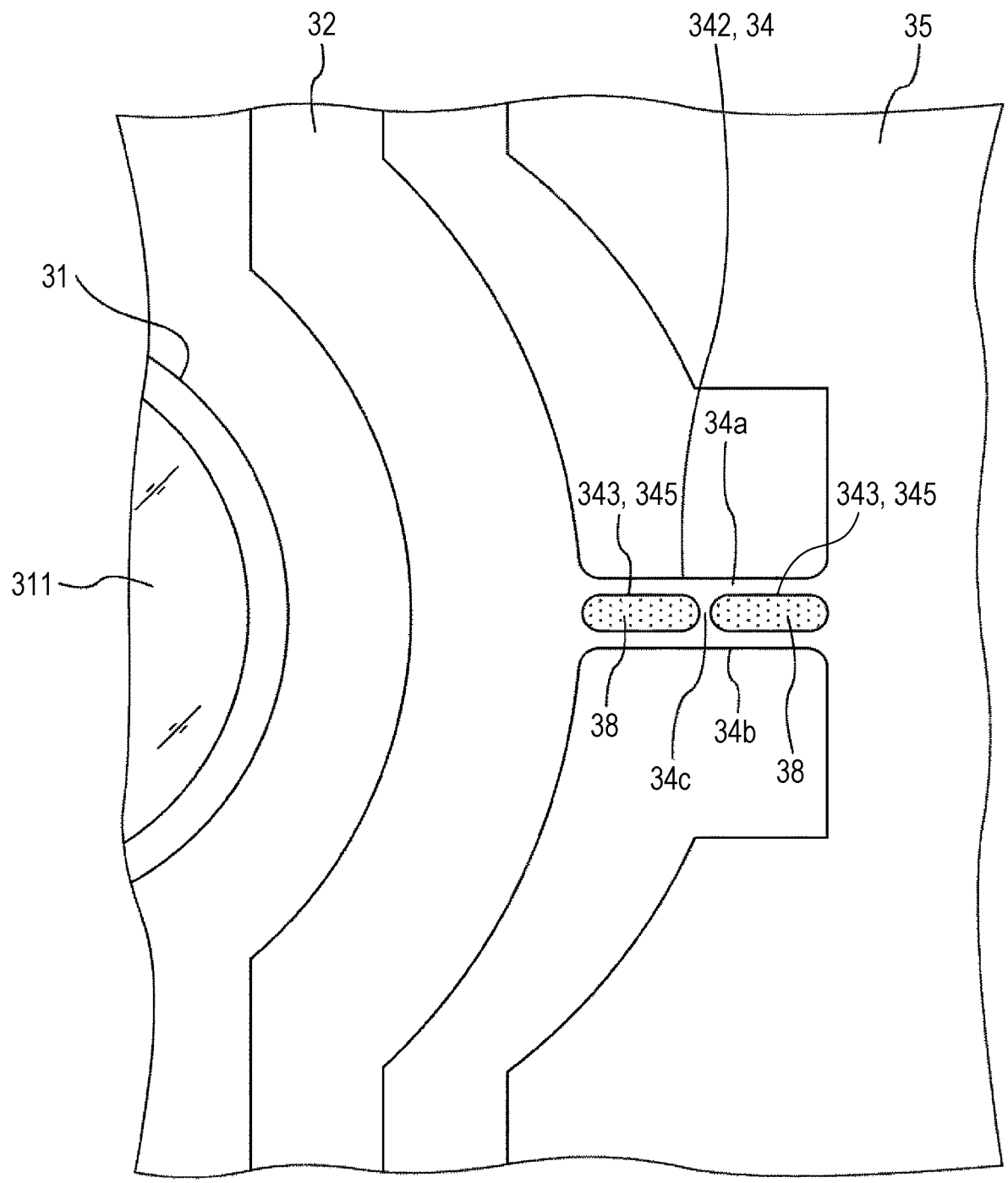
FIG. 6 is a plan view of a second axis portion included in the optical scanner shown in FIG. 2.
Figure 7:
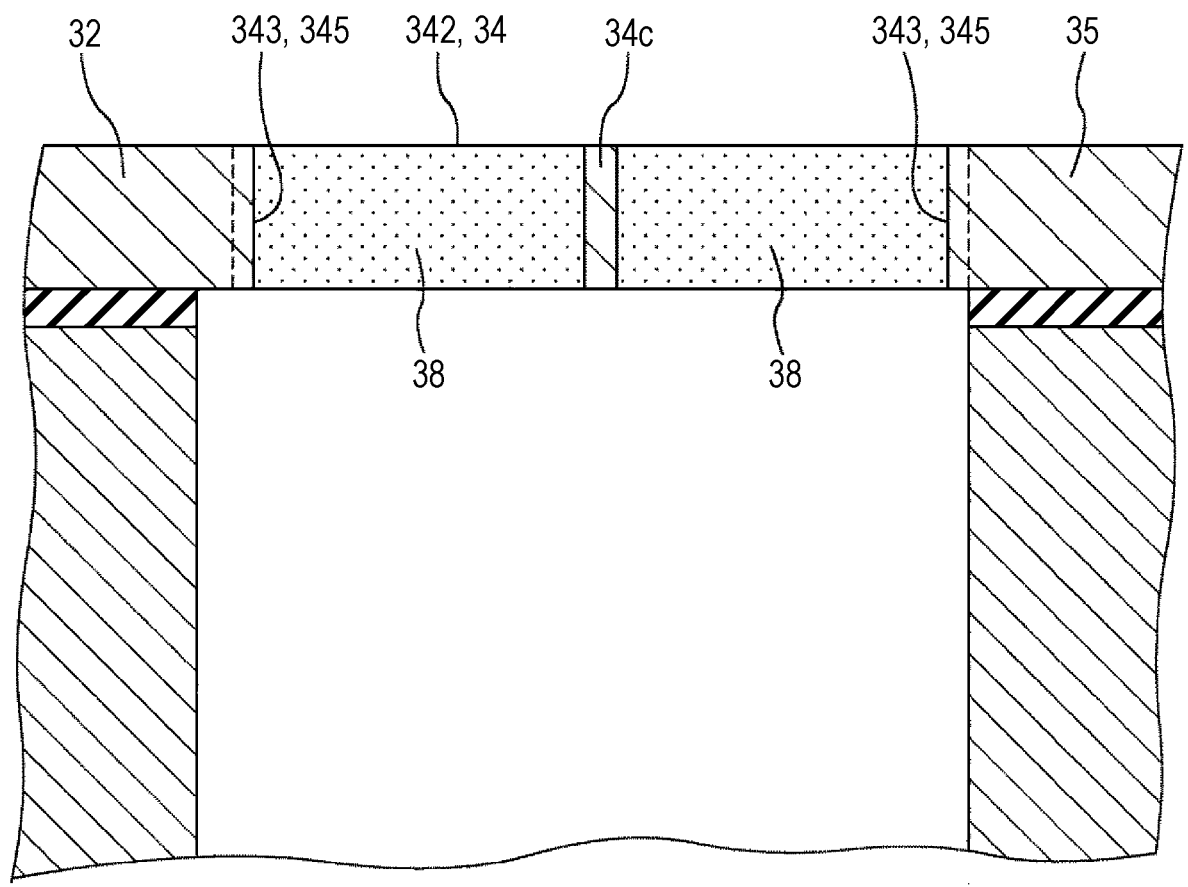
FIG. 7 is a cross-sectional view of the second axis portion shown in FIG. 6.
Figure 8:
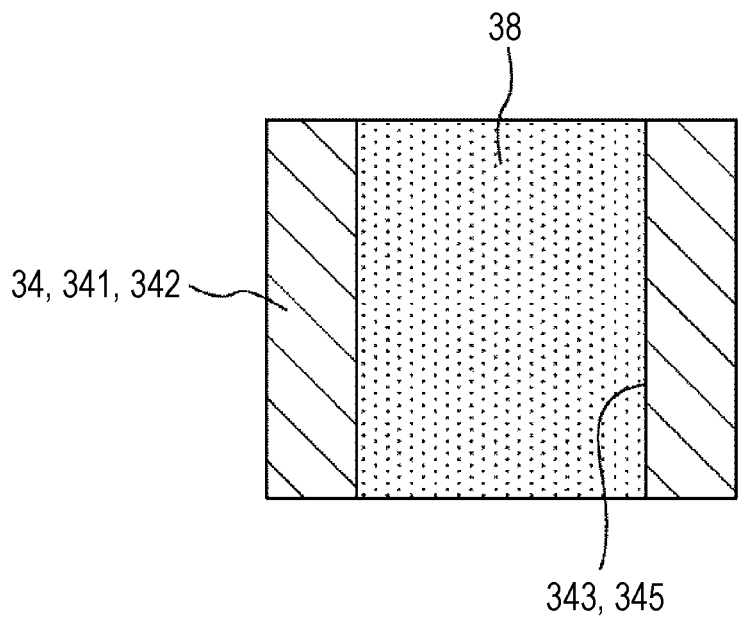
FIG. 8 is a transverse cross-sectional view of the second axis portion shown in FIG. 6.
Figure 9:
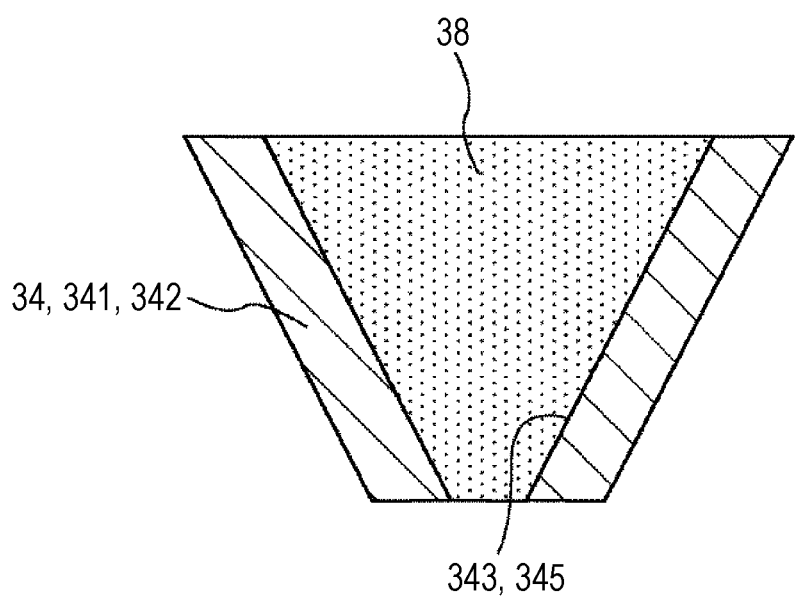
FIG. 9 is a transverse cross-sectional view that shows a modification example of the second axis portion shown in FIG. 8.
Figure 10:
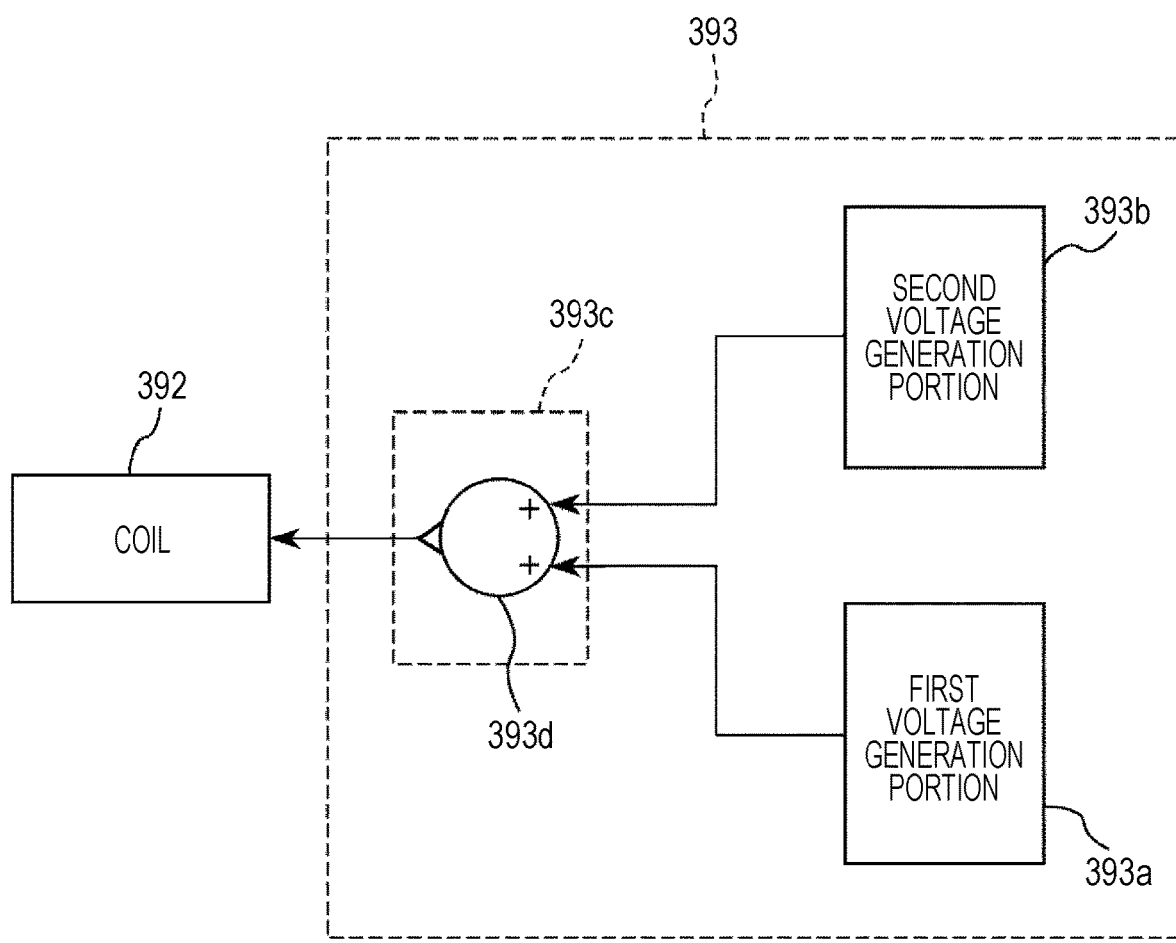
FIG. 10 is a block diagram of a voltage application portion included in the optical scanner shown in FIG. 2.
Figure 11:
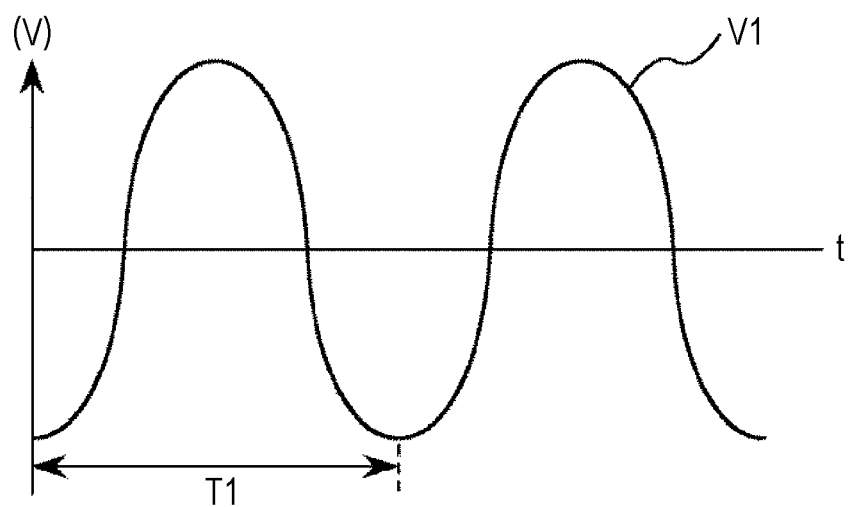
FIG. 11 is a view that shows a waveform of a first voltage generated by the voltage application portion shown in FIG. 10.
Figure 12:
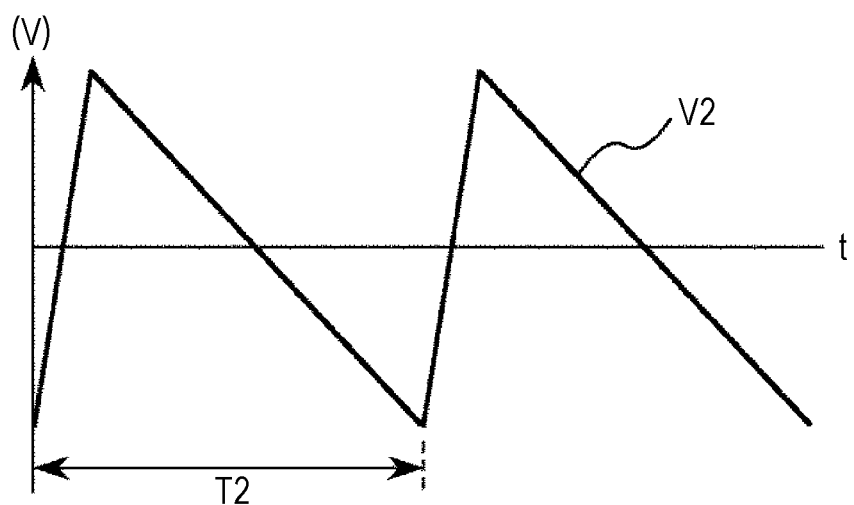
FIG. 12 is a view that shows a waveform of a second voltage generated by the voltage application portion shown in FIG. 10.

FIG. 1 is a configuration view of an image display device according to a first embodiment of the invention. FIG. 2 is a plan view of an optical scanner included in the image display device shown in FIG. 1. FIG. 3 is a cross-sectional view taken along line III-III in FIG. 2. FIG. 4 is a plan view of a second axis portion included in the optical scanner shown in FIG. 2. FIG. 5 is a cross-sectional view of the second axis portion shown in FIG. 4. FIG. 6 is a plan view of a second axis portion included in the optical scanner shown in FIG. 2. FIG. 7 is a cross-sectional view of the second axis portion shown in FIG. 6. FIG. 8 is a transverse cross-sectional view of the second axis portion shown in FIG. 6. FIG. 9 is a transverse cross-sectional view that shows a modification example of the second axis portion shown in FIG. 8. FIG. 10 is a block diagram of a voltage application portion included in the optical scanner shown in FIG. 2. FIG. 11 is a view that shows a waveform of a first voltage generated by the voltage application portion shown in FIG. 10. FIG. 12 is a view that shows a waveform of a second voltage generated by the voltage application portion shown in FIG. 10. Additionally, hereinafter, for convenience of description, the front side of the paper surface of FIG. 2 and the upper side in FIGS. 3, 5, 7, and 14A to 14F will be referred to as "up", and rear side of the paper surface of FIG. 2 and the lower side in FIGS. 3, 5, 7, and 14A to 14F will be referred to as "down".

As shown in FIG. 1, an image display device 1 is a device that displays an image (a video) by scanning a target object 10 such as a screen or a wall surface in a two-dimensional manner with a rendering laser LL. Such an image display device 1 has a modulated light generation portion 2 that generates the rendering laser (modulated light) LL, an optical scanner 3 that scans in a two-dimensional manner with the rendering laser LL generated by the modulated light generation portion 2, and a mirror 11 that causes the rendering laser LL scanned by the optical scanner 3 to be reflected. Additionally, as long as a configuration that has the optical scanner 3 is used, the configuration of the image display device 1 is not particularly limited, and for example, the mirror 11 may be omitted, and other components (members) may also be added. Hereinafter, such an image display device 1 will be described in detail.

Modulated Light Generation Portion

As shown in FIG. 1, the modulated light generation portion 2 has a plurality of light sources 21R, 21G, and 21B having different wavelengths, drive circuits 22R, 22G, and 22B that drive the light sources 21R, 21G, and 21B, collimator lenses 24R, 24G, and 24B that collimate light emitted from the light sources 21R, 21G, and 21B, a light synthesis portion 23, and a condensing lens 26.

The light source 21R emits red light, the light source 21G emits green light, and the light source 21B emits blue light. As a result of using such light of three colors, it is possible to display a full-color image. Additionally, the light sources 21R, 21G, and 21B are not particularly limited, and for example, can use a laser diode, an LED, or the like.

The drive circuit 22R drives the light source 21R, the drive circuit 22G drives the light source 21G, and the drive circuit 22B drives the light source 21B. Three types of light emitted from the light sources 21R, 21G, and 21B, which are driven by such drive circuits 22R, 22G, and 22B, are respectively collimated by the corresponding collimator lenses 24R, 24G, and 24B and are incident to the light synthesis portion 23.

The light synthesis portion 23 synthesizes light from the light sources 21R, 21G, and 21B. Such a light synthesis portion 23 has two dichroic mirrors 231 and 232. The dichroic mirror 231 has a function of transmitting red light and reflecting green light, and the dichroic mirror 232 has a function of transmitting red light and green light and reflecting blue light. As a result of using such dichroic mirrors 231 and 232, it is possible to synthesize light of the three colors of red light, green light, and blue light from the light sources 21R, 21G, and 21B. Therefore, as a result of respectively modulating the intensity of light from the light sources 21R, 21G, and 21B in an independent manner, a rendering laser LL of a predetermined color is generated. The generated rendering laser LL is incident to the optical scanner 3 after being set to a desired NA (numerical aperture) by the condensing lens 26.

The modulated light generation portion 2 has been described above, but as long as a configuration that is capable of generating the rendering laser LL is used, the configuration of the modulated light generation portion 2 is not limited to the configuration of the present embodiment.

Optical Scanner

The optical scanner 3 has a function of scanning with the rendering laser LL generated by the modulated light generation portion 2 in a two-dimensional manner. As shown in FIG. 2, the optical scanner 3 has a first movable portion 31 provided with a light reflecting portion 311, a second movable portion 32 in which the first movable portion 31 is positioned on an inner side, a first axis portion 33 that connects the first movable portion 31 and the second movable portion 32 and oscillatably supports the first movable portion 31 around a first axis J1, a second axis portion 34 that is connected to the second movable portion 32 and oscillatably supports the second movable portion 32 around a second axis J2, which intersects the first axis J1, and elastic portions 38 provided in the second axis portion 34. In addition, the second axis portion 34 has holes 345, and the elastic portions 38 are disposed in the holes 345. According to such a configuration, since it is possible to absorb and alleviate (hereinafter, simply referred to as "absorb") unnecessary vibrations of the second movable portion 32 by using the elastic portions 38, it is possible to suppress a deterioration in the oscillation characteristics of the optical scanner 3. Therefore, it is possible to achieve an optical scanner 3 capable of exhibiting excellent oscillation characteristics. Hereinafter, such an optical scanner 3 will be described in detail.

As shown in FIGS. 2 and 3, in addition to the first movable portion 31, the second movable portion 32, the first axis portion 33, and the second axis portion 34, which are mentioned earlier, the optical scanner 3 has a structural body 30 provided with a support portion 35, in which the second movable portion 32 is positioned on the inner side and which is connected to the second movable portion 32 via the second axis portion 34, and a drive mechanism 39 that causes the first movable portion 31 and the second movable portion 32 to oscillate.

The first movable portion 31 constitutes a plate form. In addition, the plan view shape of the first movable portion 31 is circular. However, the plan view shape of the first movable portion 31 is not particularly limited, and other than circular, may be elliptical, oval, triangular, rectangular, or a pentagonal or greater polygonal shape.

The light reflecting portion 311, the outer surface of which is configured as a light reflecting surface, is provided on the upper surface (one main surface) of such a first movable portion 31, and the rendering laser LL is reflected by the light reflecting portion 311. For example, such a light reflecting portion 311 can be formed by forming a metallic material such as aluminum into a film on the upper surface of the first movable portion 31. However, the configuration of the light reflecting portion 311 is not particularly limited as long as a configuration capable of relating the rendering laser LL is used. For example, in a case in which the upper surface of the first movable portion 31 has a light reflecting property, the upper surface of the first movable portion 31 functions as the light reflecting portion 311.

The second movable portion 32 constitutes a frame form, and is provided surrounding the first movable portion 31 when viewed in a planar manner from a thickness direction of the structural body 30 (the first movable portion 31 when at rest) (hereinafter, also referred to as "when viewed in a planar manner"). That is, the first movable portion 31 is provided on the inner side of the second movable portion 32. In this instance, in addition to a form having an annular form such as that of the present embodiment, the term "frame form" includes a configuration lacking a portion in the circumferential direction of a frame, and for example, includes a form such as a C-shape.

In addition, a rib 321 is provided on the lower surface of the second movable portion 32, and a permanent magnet 391 is disposed on the lower surface of the rib 321. The rib 321 has a function as a reinforcing portion that reinforces the mechanical strength of the second movable portion 32, and a function as a gap material between the first movable portion 31 and the permanent magnet 391 that ensures a space for preventing contact of the two components.

The support portion 35 constitutes a frame form, and is provided surrounding the second movable portion 32 when viewed in a planar manner. That is, the second movable portion 32 is provided on the inner side of the support portion 35. In addition, the support portion 35 is formed so as to be thicker than the other sections (the first and second movable portions 31 and 32, and the first and second axis portions 33 and 34). As a result of this, it is possible to enhance the mechanical strength of the support portion 35, and therefore, it is possible to enhance the rigidity of the support portion 35. Additionally, the configuration of the support portion 35 is not particularly limited as long as a configuration that supports the second movable portion 32 via the second axis portion 34 is used, and for example, may constitute a frame form, or may be divided into a plurality.

The first axis portion 33 oscillatably supports the first movable portion 31 around the first axis J1 relative to the second movable portion 32. Such a first axis portion 33 is provided so as to support the first movable portion 31 along the first axis J1 from both sides thereof. More specifically, the first axis portion 33 has a first movable beam portion 331 that is positioned on one side of the first movable portion 31 and extends along the first axis J1 and a first movable beam portion 332 that is positioned on the other side and extends along the first axis J1, and supports the first movable portion 31 at both ends by using the first movable beam portions 331 and 332. Such a first axis portion 33 deforms in a torsional manner in conjunction with oscillation of the first movable portion 31 around the first axis J1.

The second axis portion 34 oscillatably supports the second movable portion 32 around the second axis J2 relative to the support portion 35. Such a second axis portion 34 is provided so as to support the second movable portion 32 along the second axis J2 from both sides thereof. More specifically, the second axis portion 34 has a second movable beam portion 341 that is positioned on one side (the left side in FIG. 2) of the second movable portion 32 and extends along the second axis J2 and a second movable beam portion 342 that is positioned on the other side (the right side in FIG. 2) and extends along the second axis J2 as a pair of movable beam portions, and supports the second movable portion 32 at both ends by using the second movable beam portions 341 and 342. Such a second axis portion 34 deforms in a torsional manner in conjunction with oscillation of the second movable portion 32 around the second axis J2.

Hereinafter, such a second axis portion 34 will be described in detail. As shown in FIGS. 4 to 7, the pair of second movable beam portions 341 and 342 respectively have through-holes 343, as holes 345, which pass through the second axis portion 34 in the up-down direction, and the elastic portions 38 are disposed in the through-holes 343. Therefore, it is possible to absorb unnecessary vibrations of the second movable portion 32 by using the elastic portions 38, and therefore, it is possible to cause the second movable portion 32 to oscillate with high accuracy in a stable manner. Furthermore, when the elastic portions 38 are disposed inside the through-holes 343, it is unlikely that voids will occur between the elastic portions 38 and the second axis portion 34 (that is, an escape route for air inside the through-holes 343 is ensured), and disposition of the elastic portions 38 is facilitated. In addition, as a result of the elastic portions 38, it is possible to more effectively absorb unnecessary vibrations of the second movable portion 32 to an extent equivalent to the extent to which it is unlikely that voids will occur. Additionally, in the present embodiment, the through-holes 343 are provided passing through the second axis portion 34 in a thickness direction. As a result of this, formation of the through-holes 343 is easy.

It is preferable that the elastic portions 38 be disposed in the through-holes 343 (that the through-holes 343 be filled with the elastic portions 38) without gaps. As a result of this, it is possible to more effectively absorb unnecessary vibrations of the second movable portion 32.

The opening shapes and the cross-sectional shapes of the through-holes 343 are not particularly limited. In addition, the through-holes 343 may be provided passing through the second axis portion 34 in a width direction.

In addition, a plurality of the through-holes 343 are respectively disposed at the second movable beam portions 341 and 342 aligned at intervals along the second axis J2. That is, the pair of second movable beam portions 341 and 342 respectively have a plurality of the through-holes 343, which are disposed along the second axis J2. In particular, in the present embodiment, there is a total of four through-holes 343 with the second movable beam portions 341 and 342 respectively having two each. Further, the elastic portions 38 are disposed inside each through-hole 343 (preferably so as to fill up the through-holes 343). According to such a configuration, it is possible to reduce the sizes of the respective through-holes 343. Therefore, it is possible to prevent an excessive deterioration in the mechanical strength of the second movable beam portions 341 and 342. In addition, as a result forming a plurality of through-holes 343, since it is possible to form, midway along the second movable beam portions 341 and 342, a movable beam portion 34c that couples sections 34a and 34b, which extend to both sides, or in other words, since it is possible to adopt a configuration in which the second movable beam portions 341 and 342 respectively have a pair of sections 34a and 34b, and the movable beam portion 34c that couples the sections 34a and 34b, it is possible to prevent an excessive deterioration in the mechanical strength of the second movable beam portions 341 and 342. In addition, as a result of the movable beam portion 34c, it is possible to cause the sections 34a and 34b to deform in an integral manner (as a single elastic body), and therefore, it is possible to cause the second movable portion 32 to oscillate with high accuracy in a stable manner.

In particular, in the present embodiment, the through-holes 343 are disposed throughout substantially the entire length of each of the second movable beam portions 341 and 342. Therefore, it is possible to dispose more of the elastic portions 38, and therefore, it is possible to more effectively absorb unnecessary vibrations of the second movable portion 32 by using the elastic portions 38. Additionally, in the present embodiment, two through-holes 343 are respectively formed in the second movable beam portions 341 and 342, but the number of the through-holes 343 formed in the second movable beam portions 341 and 342 is not particularly limited, and may be one, or may be three or more. For example, the number of the through-holes 343 may be set as appropriate depending on the lengths, or the like, of the second movable beam portions 341 and 342.

Additionally, in the present embodiment, as shown in FIG. 8, the cross-sectional shapes of the second movable beam portions 341 and 342 are rectangular and the cross-sectional shapes of the through-holes 343 are also rectangular, but the cross-sectional shapes of the second movable beam portions 341 and 342 and the through-holes 343 are not particularly limited, and for example, as shown in FIG. 9, the cross-sectional shapes of the second movable beam portions 341 and 342 may be tapered forms in which the width gradually decreases in the thickness direction, and the cross-sectional shapes of the through-holes 343 may also be tapered forms in which the width gradually decreases in the thickness direction. However, as shown in FIGS. 8 and 9, it is preferable that the cross-sectional shapes of the second movable beam portions 341 and 342 and the cross-sectional shapes of the through-holes 343 be corresponding shapes.

In this instance, it is preferable that the Young's modulus of the elastic portions 38 be less than the Young's modulus of the second axis portion 34 (the second movable beam portions 341 and 342). As a result of this, it is possible to absorb unnecessary vibrations of the second movable portion 32 by using the elastic portions 38, and therefore, it is possible to cause the second movable portion 32 to oscillate with high accuracy in a stable manner. The Young's modulus of the elastic portions 38 is not particularly limited, but is preferably 1/10 or less of the elastic modulus of the second axis portion 34 (the second movable beam portions 341 and 342), is more preferably 1/100 or less, and is still more preferably 1/1000 or less. As a result of this, the above-mentioned effect is more significant. More specifically, it is preferable that the Young's modulus of the elastic portions 38 be 10 MPa to 100 MPa. As a result of this, sufficiently soft elastic portions 38 are achieved, and therefore, it is possible to more effectively absorb unnecessary vibrations of the second movable portion 32 by using the elastic portions 38. In particular, elastic portions 38 having a Young's modulus of such values are suitable in a case in which the second axis portion 34 is configured by silicon, which will be mentioned later.

The constituent material of such elastic portions 38 is not particularly limited, but preferably includes silicone. As a result of this, it is possible to easily obtain sufficiently soft elastic portions 38. In addition, the silicone is not particularly limited, and it is possible to use a silicone oil, a silicone rubber, a silicone resin, or the like. In addition, it is preferable that polydimethylsiloxane (PDMS) be the principal material of the elastic portions 38. As a result of this, as a result of controlling the molecular weight of the PDMS and the added amount of an MQ resin, it is possible to more easily obtain elastic portions 38 having the intended Young's modulus. However, the constituent material of the elastic portions 38 is not limited to silicone, and it is also possible to use another resin material, a rubber material, or the like. Additionally, the elastic portions 38, which are provided in each through-hole 343, may have equivalent Young's moduli, or may have different Young's moduli. In addition, the elastic portions 38 may be configured by the same material or may be configured by different materials.

In addition, for example, in a case in which a silicone oil is used as the elastic portions 38, although not illustrated in the drawings, for example, it is possible to adopt a configuration in which upper portion openings and lower portion openings of the through-holes 343, in which the elastic portions 38 are disposed in an inner portion, are covered by a film form object. As a result of this, it is possible to suppress release of the elastic portions 38 from the through-holes 343.

In addition, it is preferable that the elastic portions 38 be less likely to reflect the rendering laser LL than the second axis portion 34. That is, it is preferable that the elastic portions 38 have a lower reflectance of the rendering laser LL than that of the second axis portion 34. As a result of this, it is possible to suppress a circumstance in which a rendering laser LL that is shifted from the light reflecting portion 311 and is incident to the elastic portions 38 is reflected by the elastic portions 38 and becomes stray light. The method for lowering the reflectance of the rendering laser LL by the elastic portions 38 is not particularly limited, but examples include configuring the elastic portions 38 to be black by incorporating chromium (Cr), carbon black, or the like, in the constituent material of the elastic portions 38. In addition, a black resist used in the formation of a black matrix of a liquid crystal display may be used as the constituent material of the elastic portions 38.

Next, the drive mechanism 39 will be described. The drive mechanism 39 is a mechanism that causes the first movable portion 31 to oscillate around both axes of the first axis J1 and the second axis J2, and as shown in FIG. 3, has the permanent magnet 391, which is provided in the second movable portion 32, a coil 392, which generates a magnetic field that acts upon the permanent magnet 391, and a voltage application portion 393, which is connected to the coil 392.

The permanent magnet 391 is provided on the lower surface of the rib 321. In addition, the permanent magnet 391 constitutes a rod form (a longitudinal shape) in which one end side is an S pole and the other end side is an N pole, and is disposed so that both end portions are positioned on opposite sides with the center of the second movable portion 32 therebetween. In addition, the permanent magnet 391 is disposed so as to be inclined relative to both axes of the first axis J1 and the second axis J2. Additionally, although not particularly limited, the direction of magnetization of the permanent magnet 391 (a direction shown by the chain line in FIG. 2) is preferably inclined within a range of at least 10° and at most 60° relative to the first axis J1, and more preferably inclined within a range of at least 30° and at most 45°. That is, θ in FIG. 2 is preferably 10°≤θ≤60°, and more preferably 30°≤θ≤45°. As a result of this, it is possible to more reliably cause the first and second movable portions 31 and 32 to oscillate around the respective axes.

A permanent magnet 391 such as that above is not particularly limited, but for example, it is possible to suitably use a neodymium magnet, a ferrite magnet, a samarium cobalt magnet, an alnico magnetic, a bonded magnet, or the like.

As shown in FIG. 3, the coil 392 is positioned directly below the permanent magnet 391, and is disposed facing the permanent magnet 391. Further, the coil 392 is electrically connected to the voltage application portion 393, a magnetic field is generated from the coil 392 as a result of a voltage being applied to the coil 392 from the voltage application portion 393, and the magnetic field acts upon the permanent magnet 391. Additionally, the coil 392 may also have a magnetic core.

The voltage application portion 393 is configured so as to apply, to the coil 392, a drive voltage in which a first voltage for causing the first movable portion 31 to oscillate around the first axis J1 and a second voltage for causing the second movable portion 32 to oscillate around the second axis J2 are overlapped. As a result of this, it is possible to cause the first movable portion 31 to oscillate around the first axis J1 and it is possible to cause the second movable portion 32 to oscillate around the second axis J2, and therefore, as a result of this, it is possible to cause the first movable portion 31 to oscillate around both axes of the first axis J1 and the second axis J2.

As shown in FIG. 10, the voltage application portion 393 is provided with a first voltage generation portion 393*a* (a main scan driver) that generates a first voltage V1 for causing the first movable portion 31 to oscillate around the first axis J1, a second voltage generation portion 393*b* (a sub-scan driver) that generates a second voltage V2 for causing the second movable portion 32 to oscillate around the second axis J2, and a voltage overlapping portion 393*c* that overlaps the first voltage V1 and the second voltage V2, and applies, to the coil 392, a voltage overlapped by the voltage overlapping portion 393*c*.

The first voltage generation portion 393*a* generates the first voltage V1 (a main scan voltage), which changes periodically in a period T1. As shown in FIG. 11, for example, the first voltage V1 is a sine wave. In addition, for example, it is preferable that the frequency of the first voltage V1 be 10 to 40 kHz. In addition, the frequency of the first voltage V1 is set so as to be equivalent to a torsional resonance frequency of a first oscillation system in which the first movable portion 31 and the first axis portion 33 are the main components. As a result of this, since it is possible to cause the first movable portion 31 to oscillate in resonance around the first axis J1, it is possible to increase an oscillation angle of the first movable portion 31.

Meanwhile, the second voltage generation portion 393*b* generates the second voltage V2 (a sub-scan voltage), which changes periodically in a period T2, which differs from the period T1. As shown in FIG. 12, for example, the second voltage V2 is a sawtooth wave. In addition, for example, it is preferable that the frequency of the second voltage V2 be 30 to 120 Hz (in particular, approximately 60 Hz). In addition, the frequency of the second voltage V2 is set so as to differ from a torsional resonance frequency of a second oscillation system in which the first movable portion 31, the first axis portion 33, the second movable portion 32, and the second axis portion 34 are the main components. As a result of this, since it is possible to cause the second movable portion 32 to oscillate around the second axis J2 in non-resonance, it is possible to configure an object in which the waveform of oscillation of the second movable portion 32 corresponds to the waveform of the second voltage V2 (that is, it is possible to cause slow oscillation toward one side and to cause rapid oscillation toward the other side).

Additionally, when the torsional resonance frequency of the first oscillation system is defined as f1 [Hz] and the torsional resonance frequency of the second oscillation system is defined as f2 [Hz], it is preferable that a relationship of f2<f1 be satisfied, and more preferable that a relationship of f2≤f1/10 be satisfied. In this manner, as a result of sufficiently isolating f1 and f2, it is possible to effectively suppress a circumstance in which the second movable portion 32 oscillates in resonance due to the first voltage V1.

The voltage overlapping portion 393*c* is provided with an adder 393*d* for applying a voltage to the coil 392. The adder 393*d* receives the first voltage V1 from the first voltage generation portion 393*a* and receives the second voltage V2 from the second voltage generation portion 393*b*, and overlaps and applies the voltages to the coil 392.

When an overlapped voltage V in which the first voltage V1 and the second voltage V2 are overlapped is applied to the coil 392, a magnetic field that depends on the overlapped voltage V is generated from the coil 392, and the magnetic field acts on the permanent magnet 391. When this occurs, the first movable portion 31 oscillates around the first axis J1 and the second movable portion 32 oscillates around the second axis J2, and therefore, as a result of this, the first movable portion 31 oscillates in a two-dimensional manner around both axes of the first axis J1 and the second axis J2. In the above-mentioned manner, the first movable portion 31 oscillates in resonance around the first axis J1, and the second movable portion 32 oscillates in non-resonance around the second axis J2. Therefore, it is possible to cause the first movable portion 31 to oscillate around the first axis J1 with a large oscillation angle, and it is possible to cause the first movable portion 31 to oscillate around the second axis J2 with a desired waveform. Therefore, for example, an object in which the two-dimensional oscillation of the first movable portion 31 is suited to image rendering is achieved, it is possible to display a clearer image.

In this instance, in the optical scanner 3, since the permanent magnet 391 is provided in the second movable portion 32, the mass of the second movable portion 32 is large, and in conjunction with this, the moment of inertia of the second movable portion 32 is large. When the moment of inertia increases by a certain extent, since the Q value of resonance vibrations (a value that represents the ease with which resonance occurs, resonance is more likely to take place as the Q value increases) increases, it is likely that vibrations of resonance will be generated. Therefore, there is a concern that vibrations of resonance (fine vibrations in which the period is short) will be mixed in with the second movable portion 32, which vibrates in non-resonance, as unnecessary vibrations, and that the vibration characteristics of the second movable portion 32 will deteriorate. In the light of such a problem, in the present embodiment, the elastic portions 38 are provided in the second axis portion 34, and it is possible to absorb the above-mentioned vibrations of resonance (unnecessary vibrations) by using the elastic portions 38. Therefore, it is possible to cause the second movable portion 32 to oscillate with high accuracy in a stable manner. In this manner, irrespective of the whether or not the Q value of resonance is large, the effect of the elastic portions 38 is exhibited more significantly in a configuration that has the second movable portion 32 that is caused to oscillate in non-resonance.

Since an image display device 1 that has such an optical scanner 3 benefits from the effect of the optical scanner 3, an image display device having high reliability is achieved.

Manufacturing Method

Figure 13:
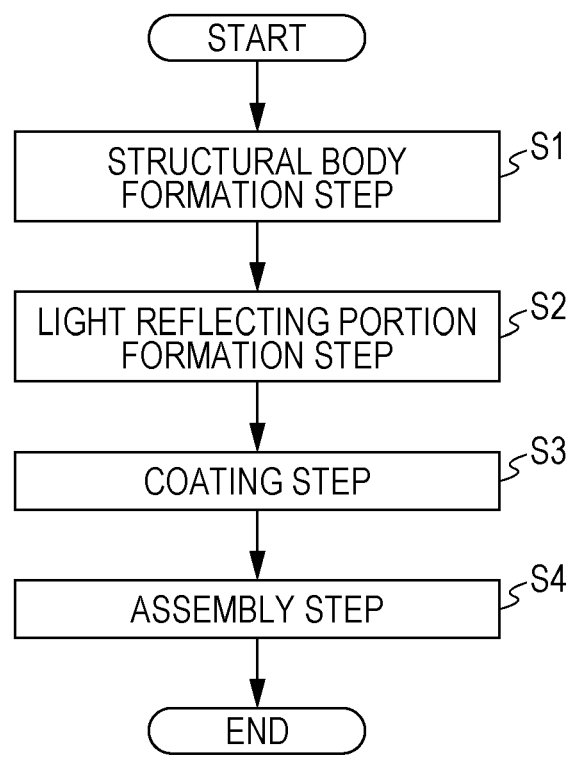
FIG. 13 is a flowchart that describes manufacturing steps of an optical scanner.

FIG. 13 is a flowchart that describes manufacturing steps of an optical scanner. FIGS. 14A to 14F are cross-sectional views at the second axis in each step. Next a method for manufacturing the optical scanner 3 will be described with reference to FIGS. 13, and 14A to 14F.

Figure 14A:
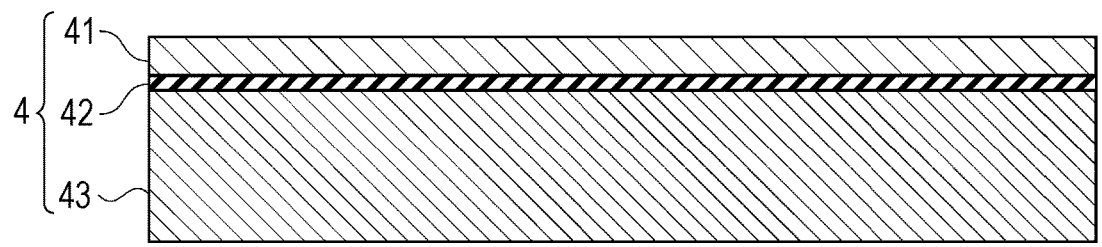
FIG. 14A is a cross-sectional view at the second axis in each step.
Figure 14B:
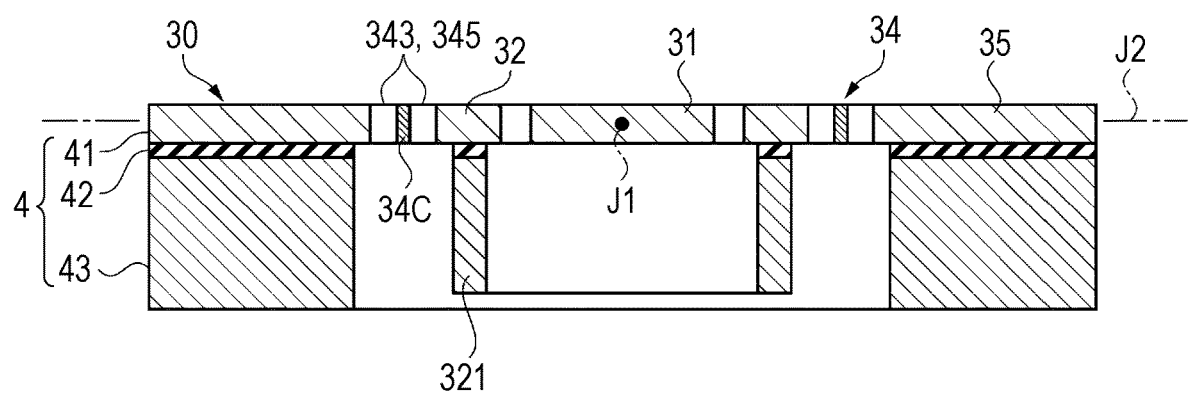
FIG. 14B is a cross-sectional view at the second axis in each step.

Step S1 is a structural body formation step for forming the structural body 30 that includes the first movable portion 31, the second movable portion 32, the first axis portion 33, the second axis portion 34, and the holes 345. As shown in FIG. 14A, a substrate 4 is prepared. The substrate 4 is an SOI substrate obtained by laminating a first silicon layer (a device layer) 41, a silicon oxide layer (a box layer) 42, and a second silicon layer (a handle layer) 43 in this order. The structural body 30 is formed by forming a pattern on the substrate 4 using a photolithography technique and an etching technique (dry etching, wet etching, or the like). As a result of this, as shown in FIG. 14B, the first movable portion 31, the second movable portion 32, the first axis portion 33, the second axis portion 34, the support portion 35, and the through-holes 343 (the holes 345) are formed on the substrate 4. In this manner, as a result of using an etching technique, it is possible to form a pattern on the substrate 4 easily and with high accuracy. Additionally, the first movable portion 31, the second movable portion 32, the first axis portion 33, the second axis portion 34 are formed from the first silicon layer 41, the support portion 35 is formed from the first silicon layer 41, the silicon oxide layer 42, and the second silicon layer 43, and the rib 321 is formed from the silicon oxide layer 42 and the second silicon layer 43. Additionally, the structural body 30 need not necessarily be formed from an SOI substrate, and may be formed by using a material other than silicon.

Figure 14C:
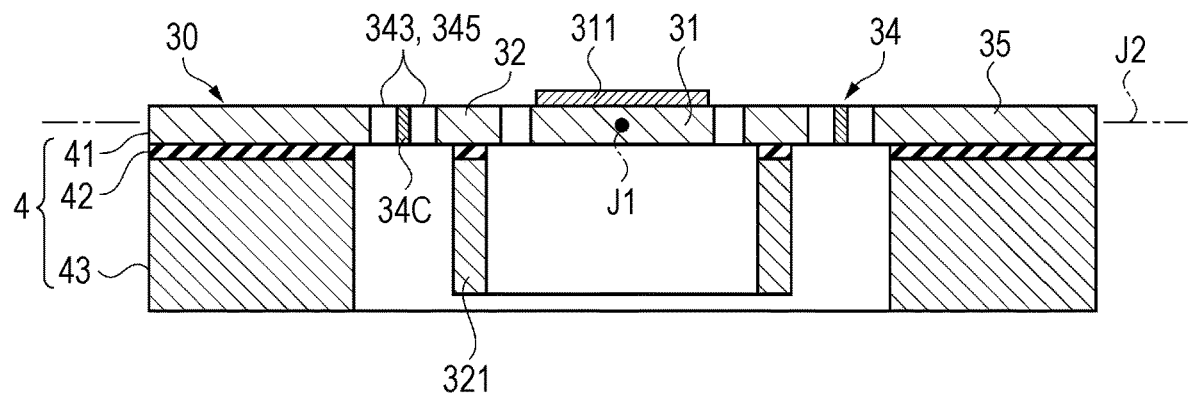
FIG. 14C is a cross-sectional view at the second axis in each step.

Step S2 is a light reflecting portion formation step for forming the light reflecting portion 311. The light reflecting portion 311 is formed by forming an aluminum film on the upper surface (the first silicon layer 41 side) of the first movable portion 31. The aluminum film can be formed by performing vapor deposition or sputtering in a state in which a mask (not illustrated in the drawings) in which the upper surface corresponding to the first movable portion 31 is open is superimposed on the structural body 30. As a result of this, as shown in FIG. 14C, the light reflecting portion 311 is formed on the upper surface of the first movable portion 31.

Figure 14D:
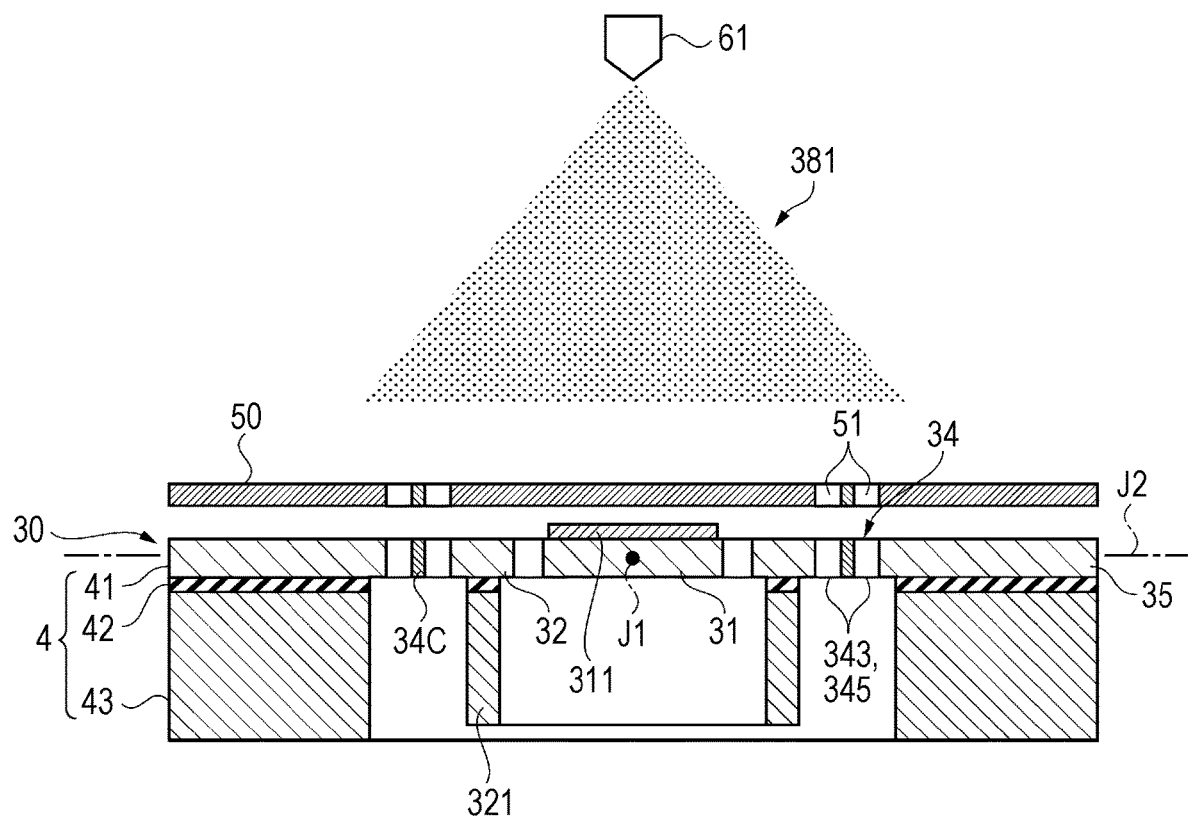
FIG. 14D is a cross-sectional view at the second axis in each step.
Figure 14E:
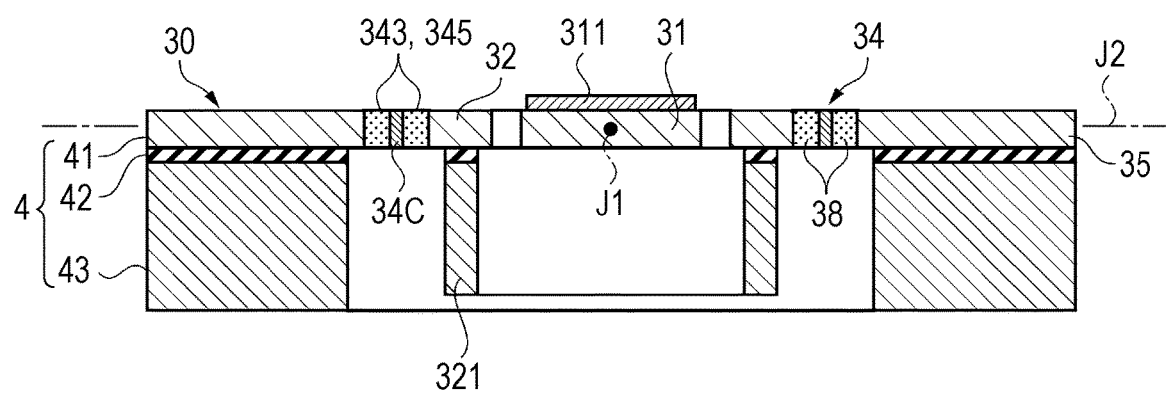
FIG. 14E is a cross-sectional view at the second axis in each step.

Step S3 is a coating step for coating the structural body 30 with a constituent material 381 of the elastic portions 38 by using a spray coating technique via a mask 50 having opening portions 51 that correspond to the holes 345. The elastic portions 38 are formed by filling the hole 345 (the through-holes 343) with the constituent material 381. As shown in FIG. 14D, firstly, the mask 50, which has opening portions 51 in which the upper surface corresponding to the holes 345 is open, is superimposed on the upper surface of the structural body 30. Further, the constituent material 381 is discharged toward the structural body 30 by using a spray coating technique that ejects fine liquid droplets from a nozzle 61 installed above the structural body 30. As a result of this, as shown in FIG. 14E, the elastic portions 38 are formed as a result of liquid droplets of the constituent material 381 that are landed on the narrow holes 345 being deposited as a result of being drawn inside the holes 345. Additionally, the opening portions 51 may be opened to a larger extent than the holes 345 in consideration of matching precision of the mask 50 and the structural body 30. In addition, coating of the constituent material 381 may be performed by using an electrostatic spray coating technique that applies a voltage between the nozzle 61 and the structural body 30, and traps charged liquid droplets of the constituent material 381 on the structural body 30 due to an electrostatic force.

Figure 14F:
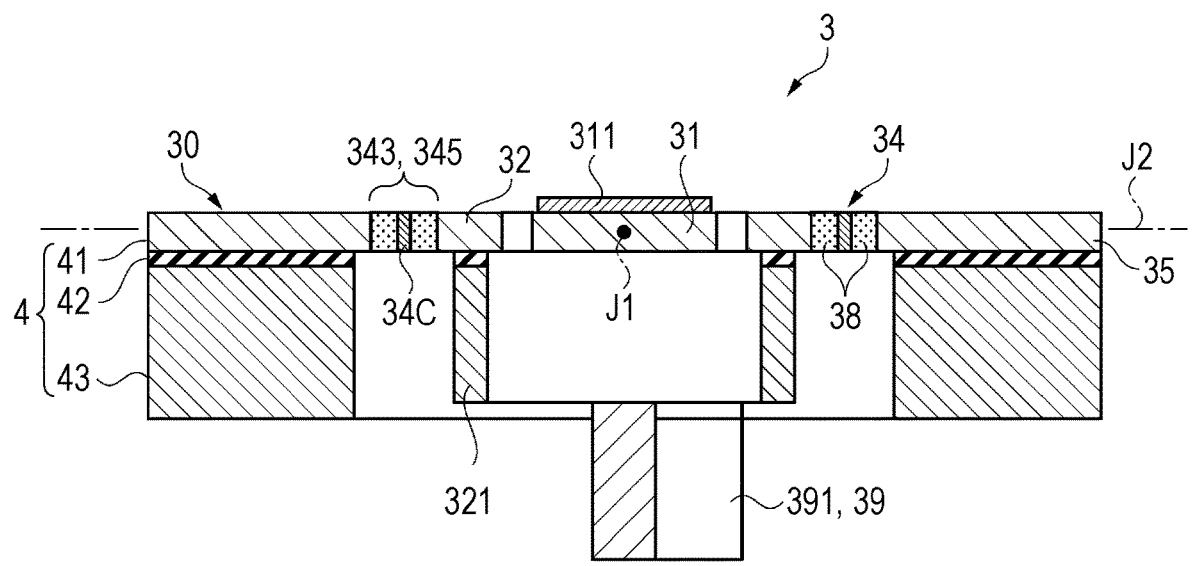
FIG. 14F is a cross-sectional view at the second axis in each step.
Figure 14F:
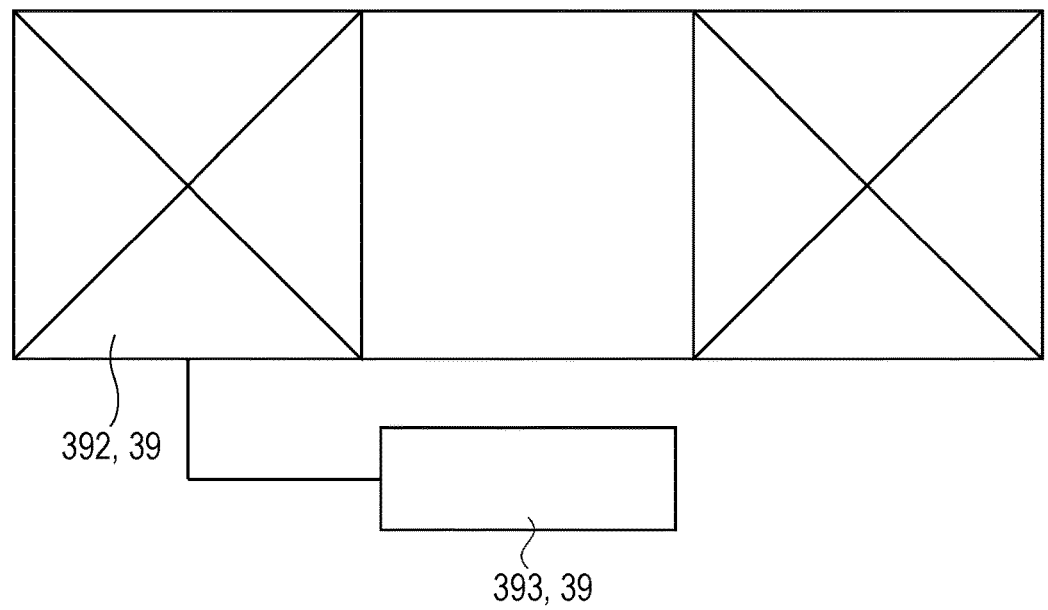

Step S4 is an assembly step in which the optical scanner 3 is assembled. In the assembly step, the permanent magnet 391 is provided on the lower surface of the second movable portion 32, and the coil 392 is installed in a position that faces the permanent magnet 391. As a result of this, as shown in FIG. 14F, the optical scanner 3 is obtained.

As a result of the above-mentioned manufacturing method, it is possible to manufacture an optical scanner 3 capable of absorbing and alleviating unnecessary vibrations of the second movable portion 32 by using the elastic portions 38.

Second Embodiment

Figure 15:
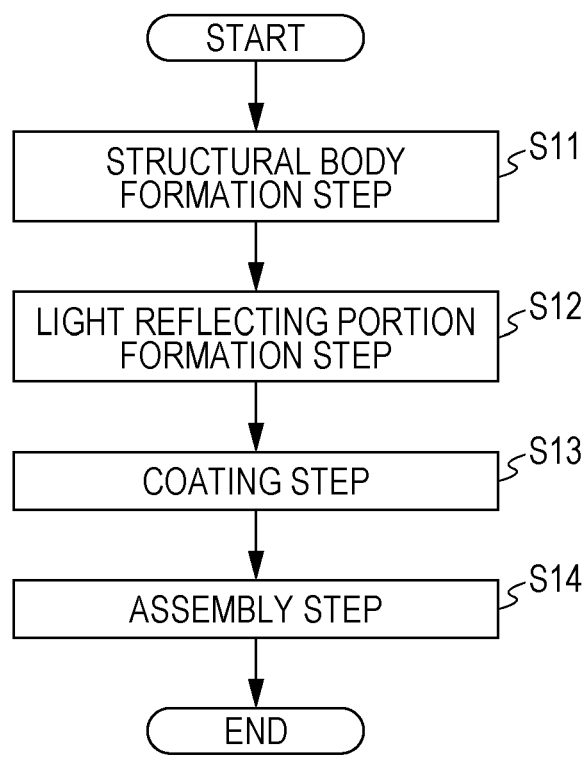
FIG. 15 is a flowchart that describes manufacturing steps of an optical scanner according to a second embodiment.
Figure 16A:
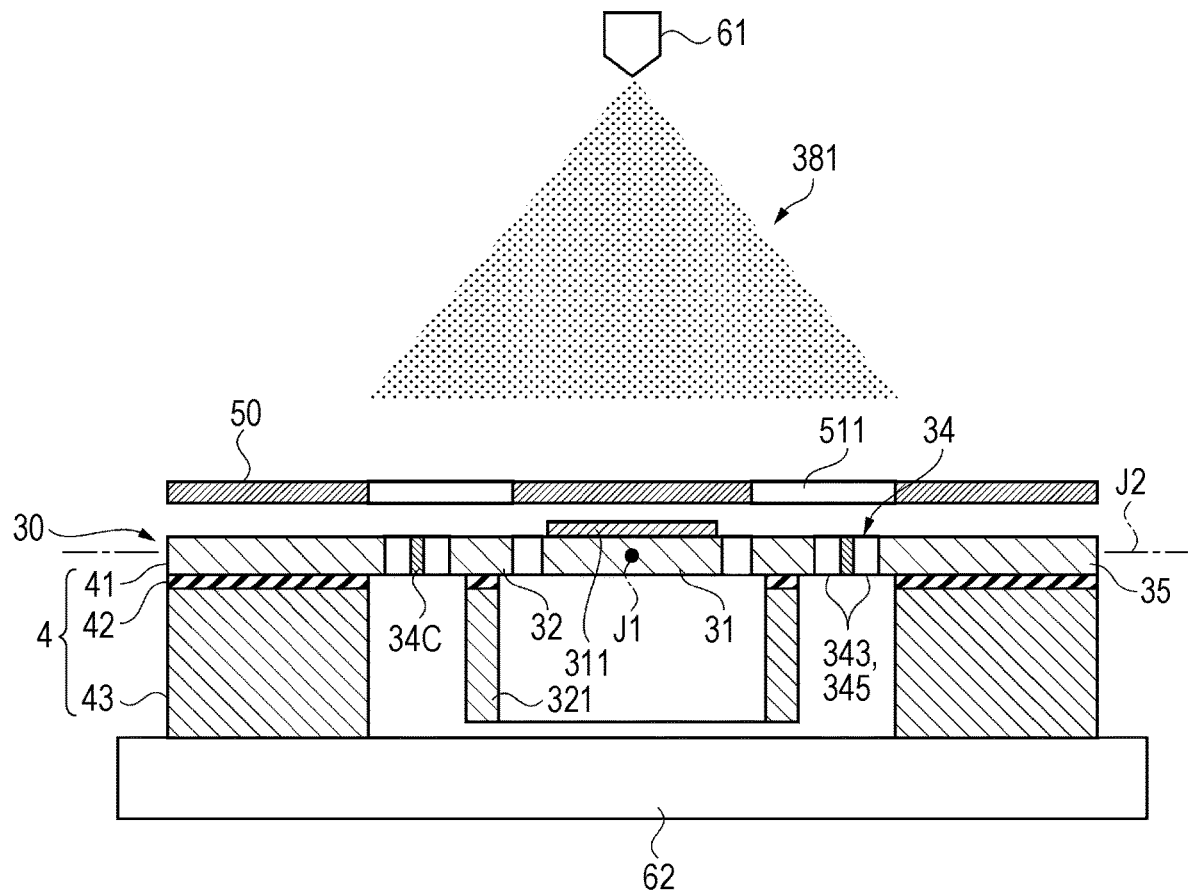
FIG. 16A is a cross-sectional view at the second axis in each step.
Figure 16B:
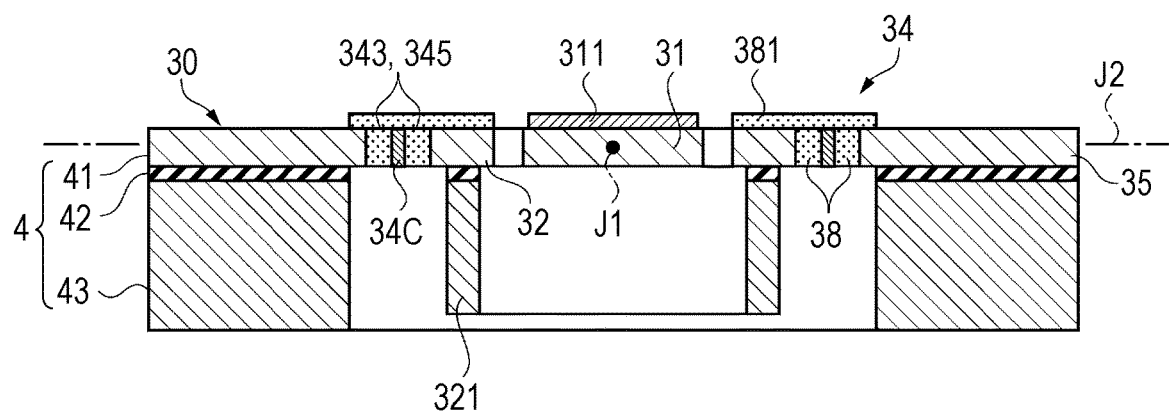
FIG. 16B is a cross-sectional view at the second axis in each step.
Figure 17:
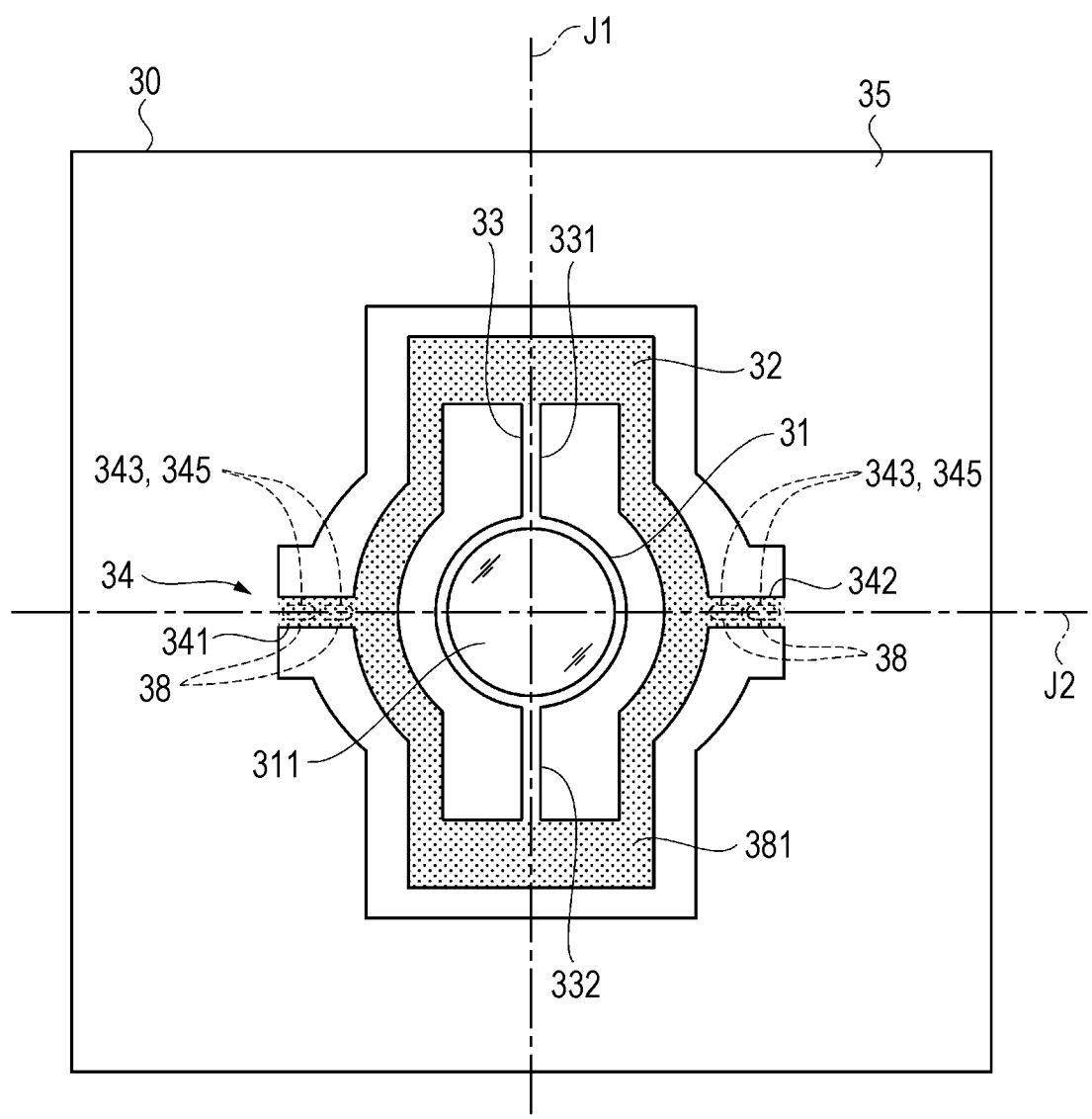
FIG. 17 is a plan view of FIG. 16B.
Figure 18:
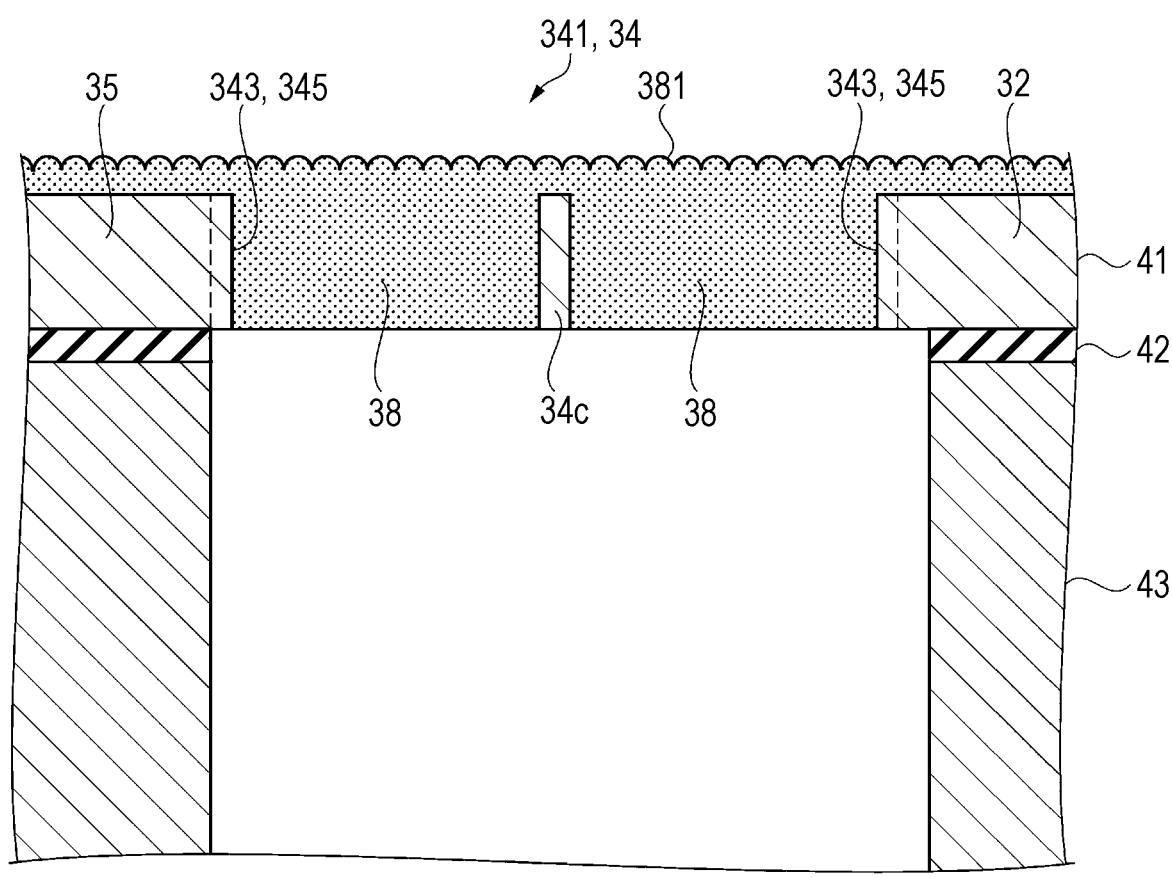
FIG. 18 is an enlarged cross-sectional view of two axis portions in FIG. 16B.

FIG. 15 is a flowchart that describes manufacturing steps of an optical scanner according to a second embodiment. FIGS. 16A and 16B are cross-sectional views at the second axis in each step. FIG. 17 is a plan view of FIG. 16B. FIG. 18 is an enlarged sectional view of two axis portions in FIG. 16B. Next a method for manufacturing an optical scanner 3 according to the second embodiment of the invention will be described with reference to FIGS. 15, 16A and 16B, 17, and 18. Additionally, constituent sites that are the same as those of the first embodiment will be given the same reference numerals, and overlapping descriptions will be omitted. In addition, since Step S11, Step S12, and Step S14 are the same as Step S1, Step S2, and Step S4 described in the first embodiment, the descriptions thereof will be omitted. In the optical scanner 3 of the present embodiment, the upper surface of the second axis portion 34 and the second movable portion 32 is coated with a constituent material 381 that includes a black pigment.

Step S13 is a coating step for coating the structural body 30 with a constituent material 381 of the elastic portions 38 by using a spray coating technique. The opening portions 51 of the mask 50 used in the present step are openings that also correspond to at least a portion the second axis portion 34 and the second movable portion 32. In the mask 50 used in the present embodiment, the entire surface of the upper surface that corresponds to the second axis portion 34 and the second movable portion 32 is open. In addition, a black pigment is included in the constituent material 381 applied in the present embodiment. It is possible to a black carbon, or the like, as the black pigment.

As shown in FIG. 16A, firstly, the structural body 30 is heated to approximately 100° C. by using a heater 62, and the mask 50, which has opening portions 511 in which the entire surface of the upper surface corresponding to the second axis portion 34 and the second movable portion 32 is open, is superimposed on the upper surface of the structural body 30. Further, the constituent material 381 is discharged toward the structural body 30 by using a spray coating technique that ejects fine liquid droplets from the nozzle 61 installed above the structural body 30. As a result of this, as shown in FIG. 16B, since the elastic portions 38 are formed as a result of the constituent material 381 being deposited inside the holes 345, it is possible to exhibit a similar effect to that of the above-mentioned first embodiment. Furthermore, as shown in FIG. 17, the upper surface of the second axis portion 34 and the second movable portion 32 is coated with the constituent material 381. As a result of this, the second axis portion 34 and the second movable portion 32 are covered by a black constituent material 381 having a low reflectance of light. Accordingly, it is possible to suppress a circumstance in which a rendering laser LL that is shifted from the light reflecting portion 311 and is incident to the second axis portion 34 and the second movable portion 32 is reflected by second axis portion 34 and the second movable portion 32 and becomes stray light.

In addition, as shown in FIG. 18, in the present embodiment, since the structural body 30 is heated, liquid droplets of the constituent material 381 that are landed on the structural body 30 (the second axis portion 34 and the second movable portion 32) are deposited in granular form as a result of the solvent included in the constituent material 381 evaporating. As a result of this, a rendering laser LL that is shifted from the light reflecting portion 311 and is incident to the second axis portion 34 and the second movable portion 32 is reflected as scattered light by the constituent material 381 deposited in granular form on the second axis portion 34 and the second movable portion 32 and is attenuated. Accordingly, it is possible to further suppress a circumstance in which the rendering laser LL that is incident to the second axis portion 34 and the second movable portion 32 is reflected by the second axis portion 34 and the second movable portion 32 and becomes stray light.

Third Embodiment

Next, an optical scanner according to a third embodiment of the invention will be described.

Figure 19:
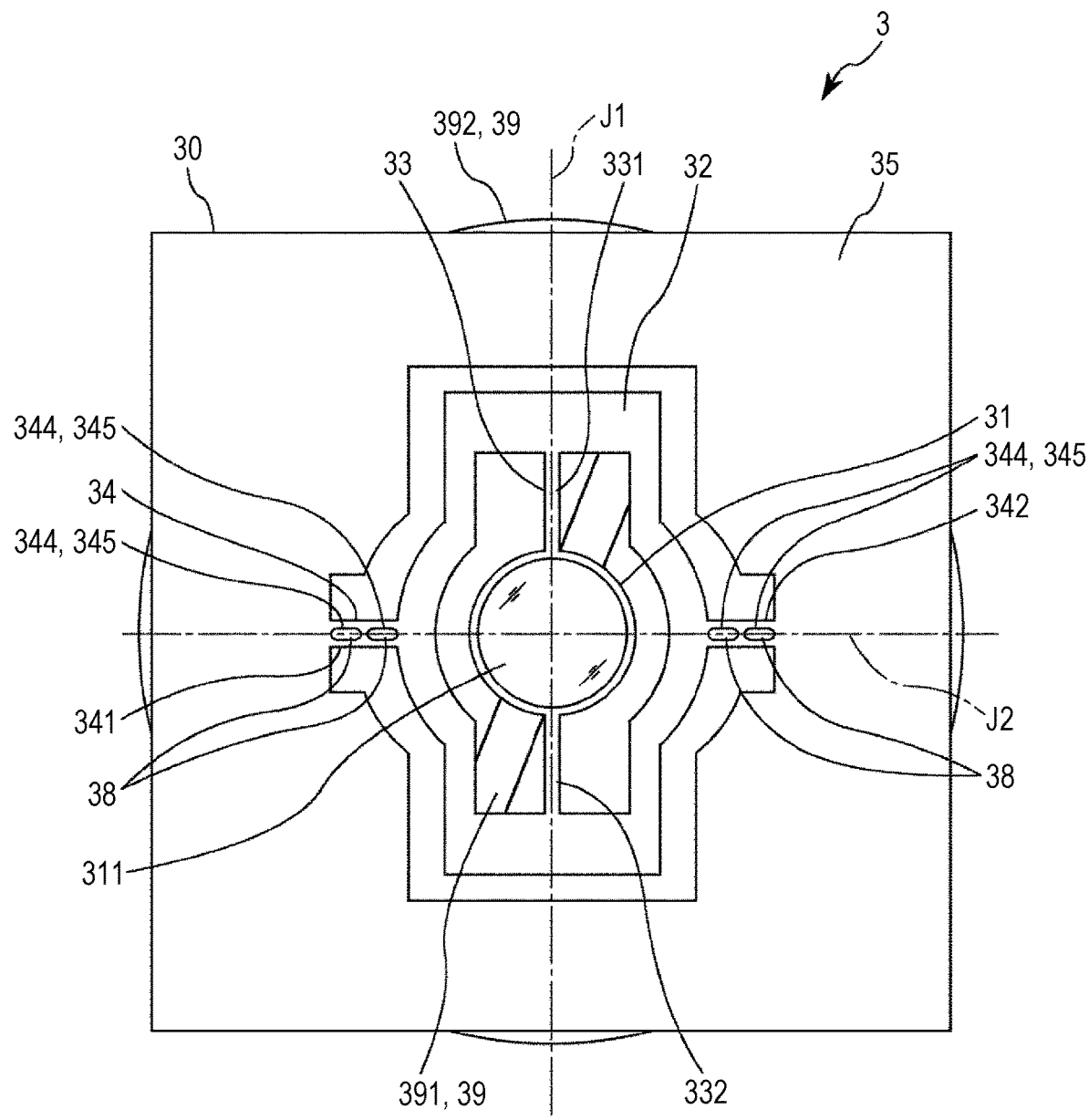
FIG. 19 is a plan view of an optical scanner according to a third embodiment.
Figure 20:
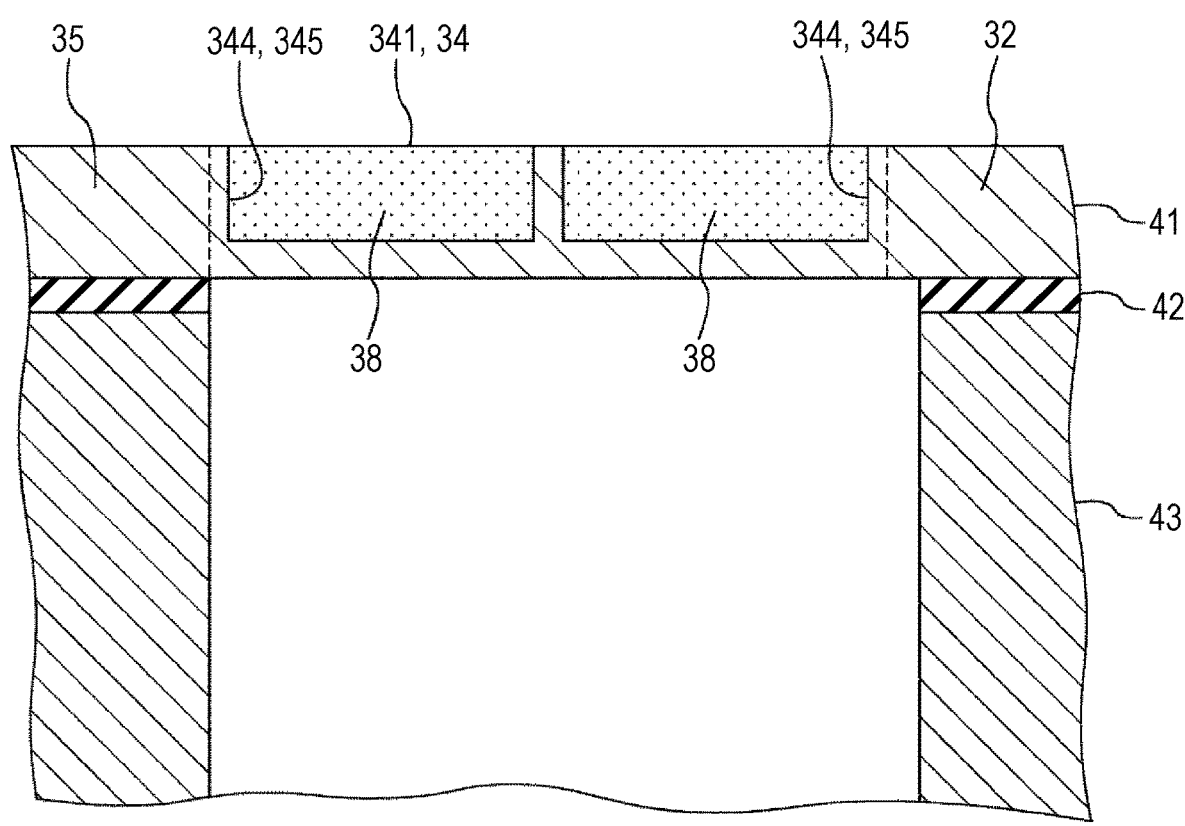
FIG. 20 is a cross-sectional view of a second axis portion included in the optical scanner shown in FIG. 19.
Figure 21:
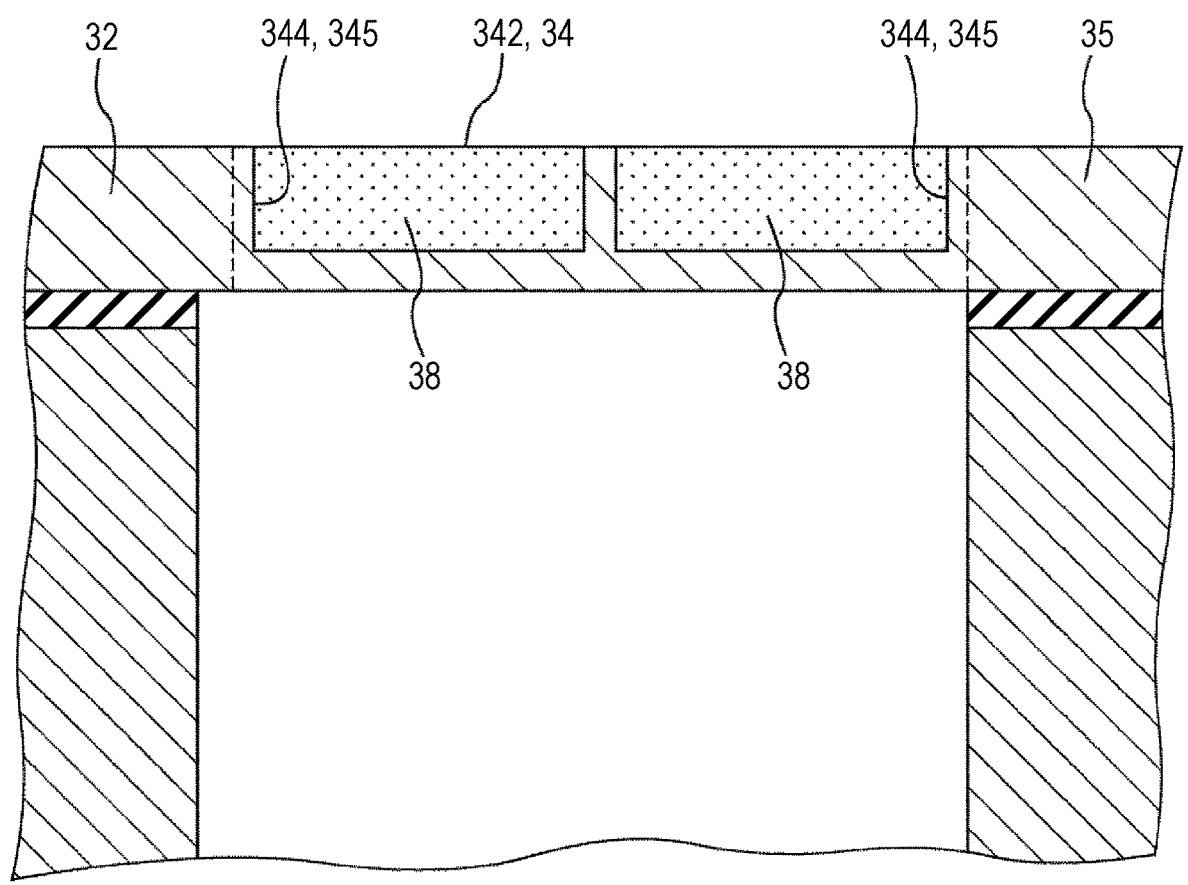
FIG. 21 is a cross-sectional view of a second axis portion included in the optical scanner shown in FIG. 19.
Figure 22:
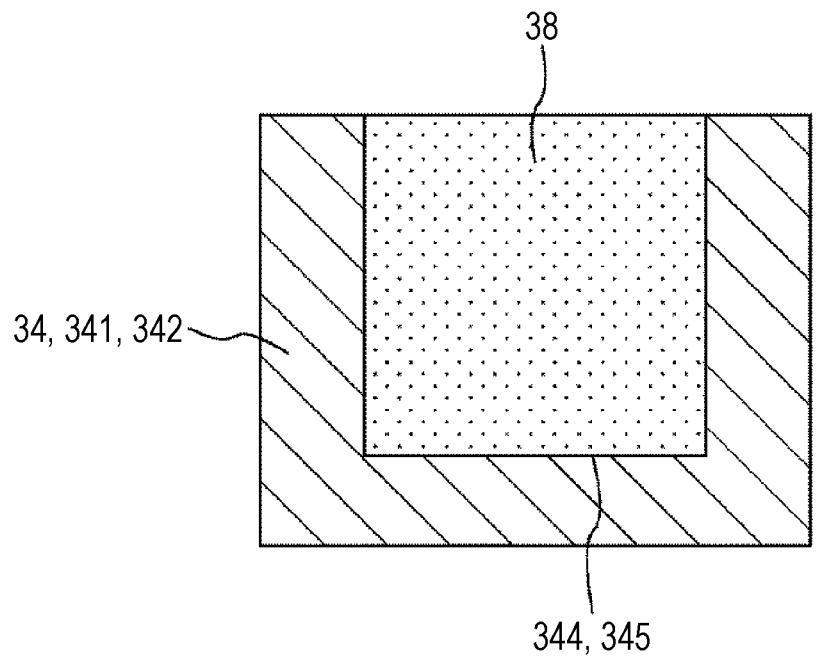
FIG. 22 is a cross-sectional view that shows a cross-sectional shape of a recessed portion formed on the second axis portion.
Figure 23:
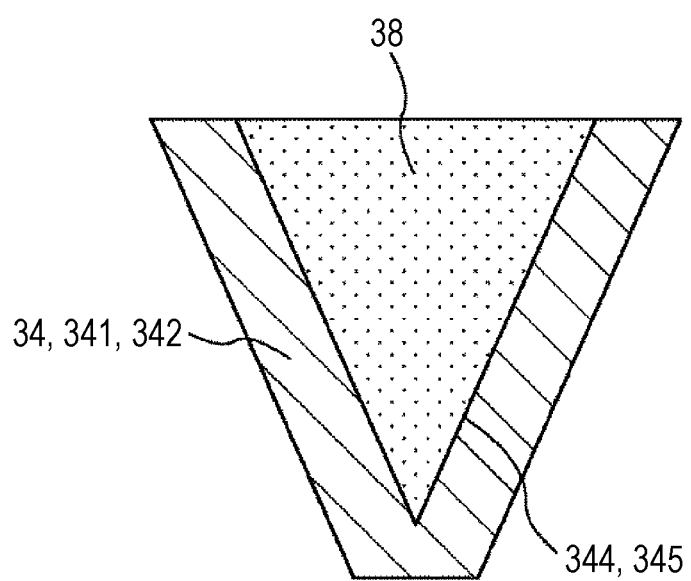
FIG. 23 is a cross-sectional view that shows a cross-sectional shape of a recessed portion formed on the second axis portion.

FIG. 19 is a plan view of an optical scanner according to a third embodiment of the invention. FIGS. 20 and 21 are respectively a cross-sectional view of a second axis portion included in the optical scanner shown in FIG. 19. FIGS. 22 and 23 are respectively a cross-sectional view that shows a cross-sectional shape of a recessed portion formed on the second axis portion.

Hereinafter, an optical scanner of the third embodiment will be described focusing on the differences from the above-mentioned embodiments, and the description of like matters will be omitted.

Other than the fact that the configuration of the second axis portion is different, the optical scanner according to the third embodiment of the invention is substantially similar to that of the above-mentioned first embodiment. Additionally, similar configurations to those of the above-mentioned embodiments are given identical reference symbols.

As shown in FIGS. 19 to 21, the second axis portion (the second movable beam portions 341 and 342) have recessed portions 344, which are bottomed-holes, as the holes 345, and the elastic portions 38 are disposed in the recessed portions 344. According to such a configuration, in a similar manner to that of the above-mentioned first embodiment, since it is possible to absorb unnecessary vibrations of the second movable portion 32 by using the elastic portions 38, it is possible to suppress a deterioration in the oscillation characteristics of the optical scanner 3. Therefore, it is possible to achieve an optical scanner 3 capable of exhibiting excellent oscillation characteristics.

Additionally, in the present embodiment, the recessed portions 344 are provided opened in the upper surface of the second axis portion 34. As a result of this, formation of the recessed portions 344 is facilitated. However, the recessed portions 344 may be provided opened in the side surfaces of the second axis portion 34, or may be provided opened in the lower surface. In addition, in the present embodiment, as shown in FIG. 22, the cross-sectional shapes of the second axis portion 34 (the second movable beam portions 341 and 342) are rectangular and the cross-sectional shapes of the recessed portions 344 are also rectangular, but the cross-sectional shapes of the second axis portion 34 (the second movable beam portions 341 and 342) and the recessed portions 344 are not particularly limited, and for example, as shown in FIG. 23, the cross-sectional shapes of the second axis portion 34 (the second movable beam portions 341 and 342) may be V-shaped, and the cross-sectional shapes of the recessed portion 344 may be triangular.

In addition, the pair of second movable beam portions 341 and 342 respectively have a plurality of the recessed portions 344, which are disposed along the second axis J2. Further, an elastic portion 38 is provided in each recessed portion 344. According to such a configuration, it is possible to prevent a circumstance in which one recessed portion 344 is too large. Therefore, it is possible to prevent an excessive deterioration in the mechanical strength of the second movable beam portions 341 and 342.

In particular, in the present embodiment, the plurality of the recessed portions 344 are respectively disposed throughout substantially the entire length of the second movable beam portions 341 and 342. Therefore, it is possible to dispose more of the elastic portions 38, and therefore, it is possible to more effectively absorb unnecessary vibrations of the second movable portion 32 by using the elastic portions 38. Additionally, in the present embodiment, two recessed portions 344 are respectively formed in the second movable beam portions 341 and 342, but the number of the recessed portions 344 formed in the second movable beam portions 341 and 342 is not particularly limited, and may be one, or may be three or more. For example, the number of the recessed portions 344 may be set as appropriate depending on the lengths, or the like, of the second movable beam portions 341 and 342.

As a result of such a third embodiment, it is also possible to exhibit a similar effect to that of the above-mentioned first embodiment.

Fourth Embodiment

Next, an optical scanner according to a fourth embodiment of the invention will be described.

Figure 24:
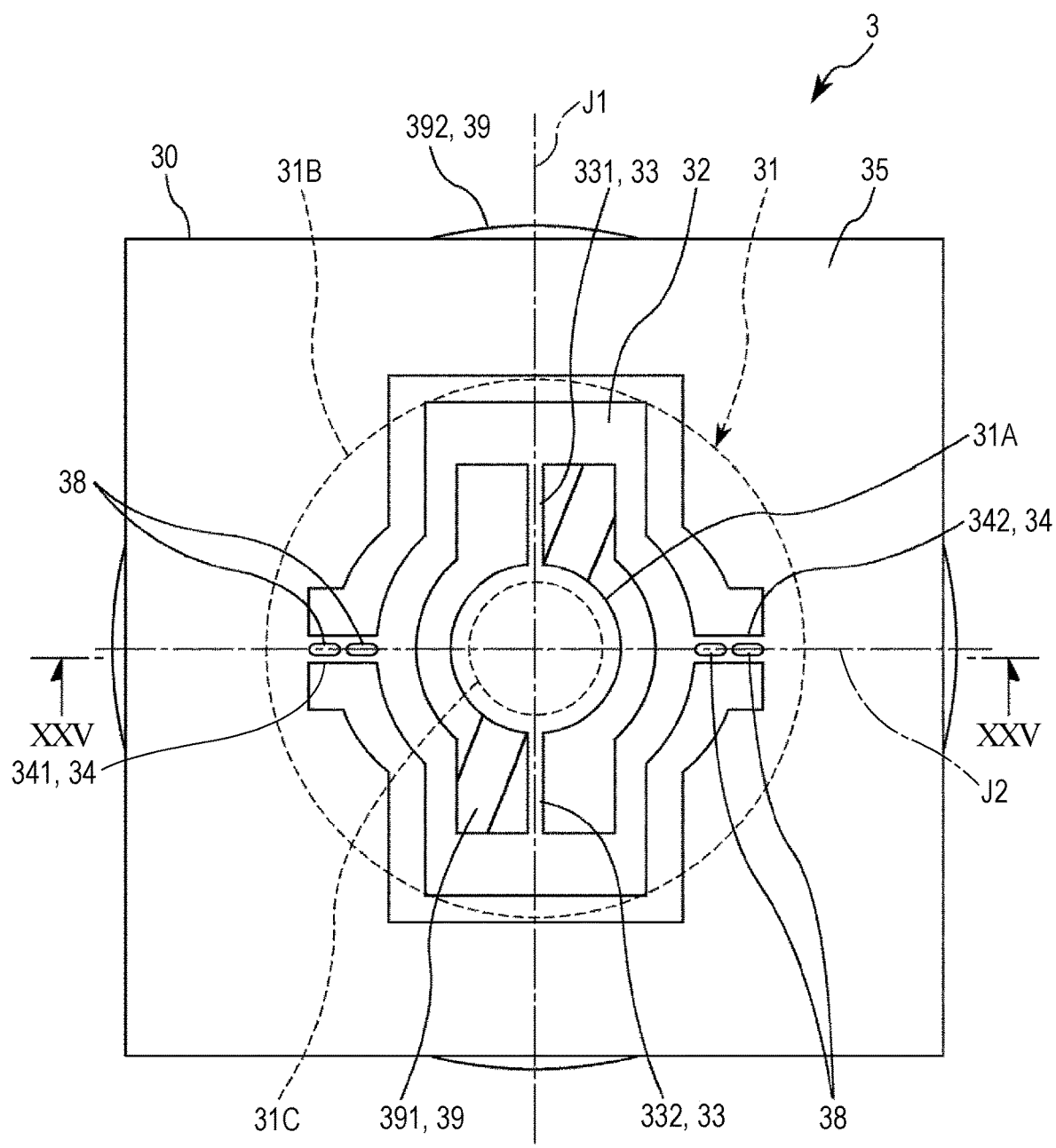
FIG. 24 is a plan view of an optical scanner according to a fourth embodiment.
Figure 25:
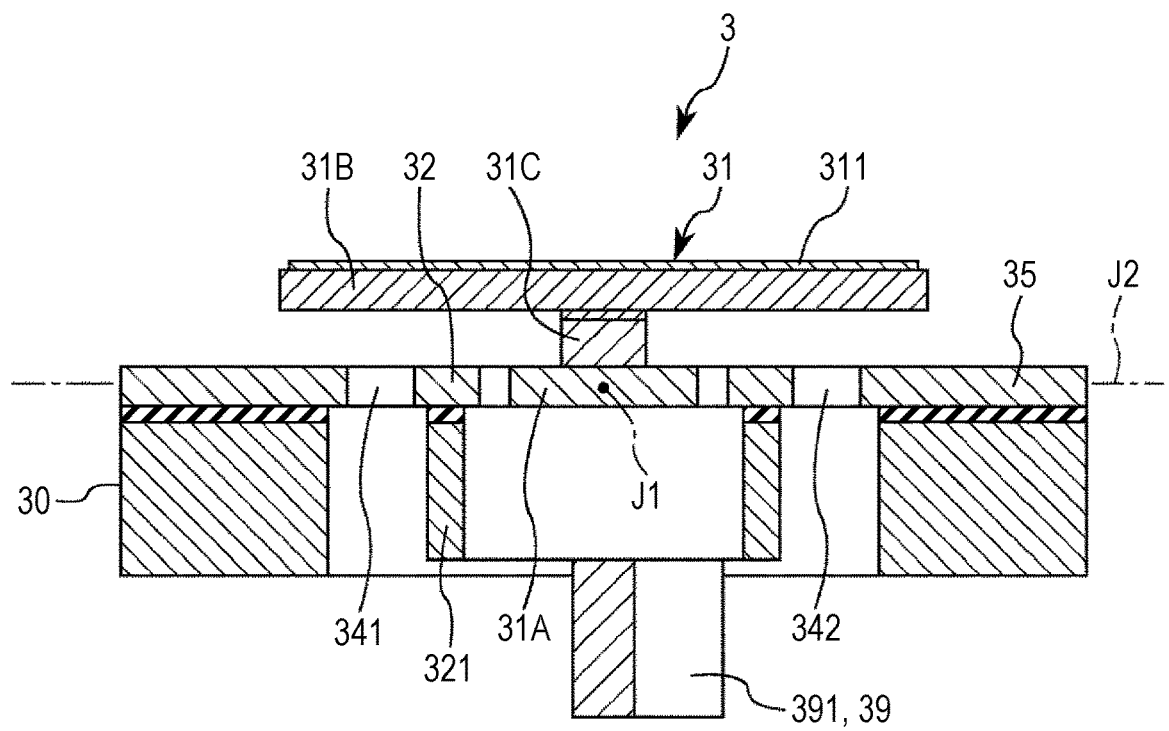
FIG. 25 is a cross-sectional view taken along line XXV-XXV in FIG. 24.
Figure 25:
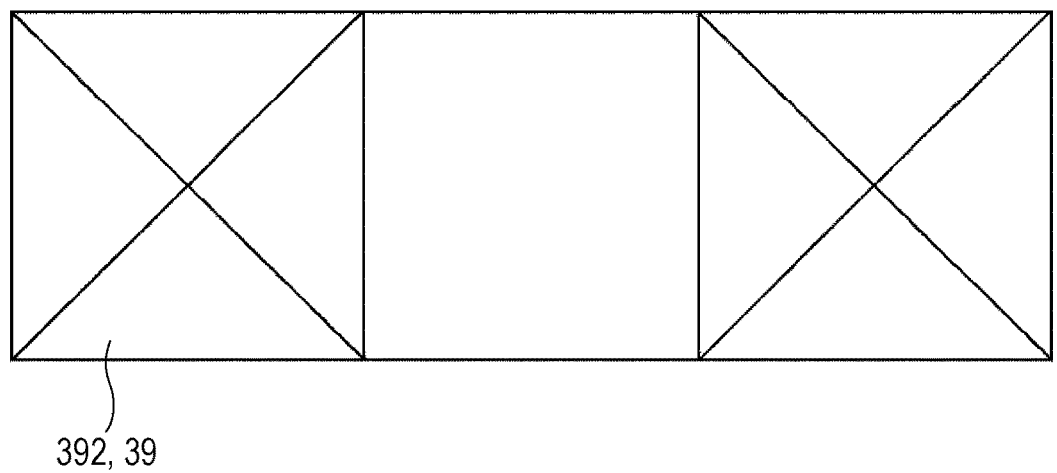
Figure 26:
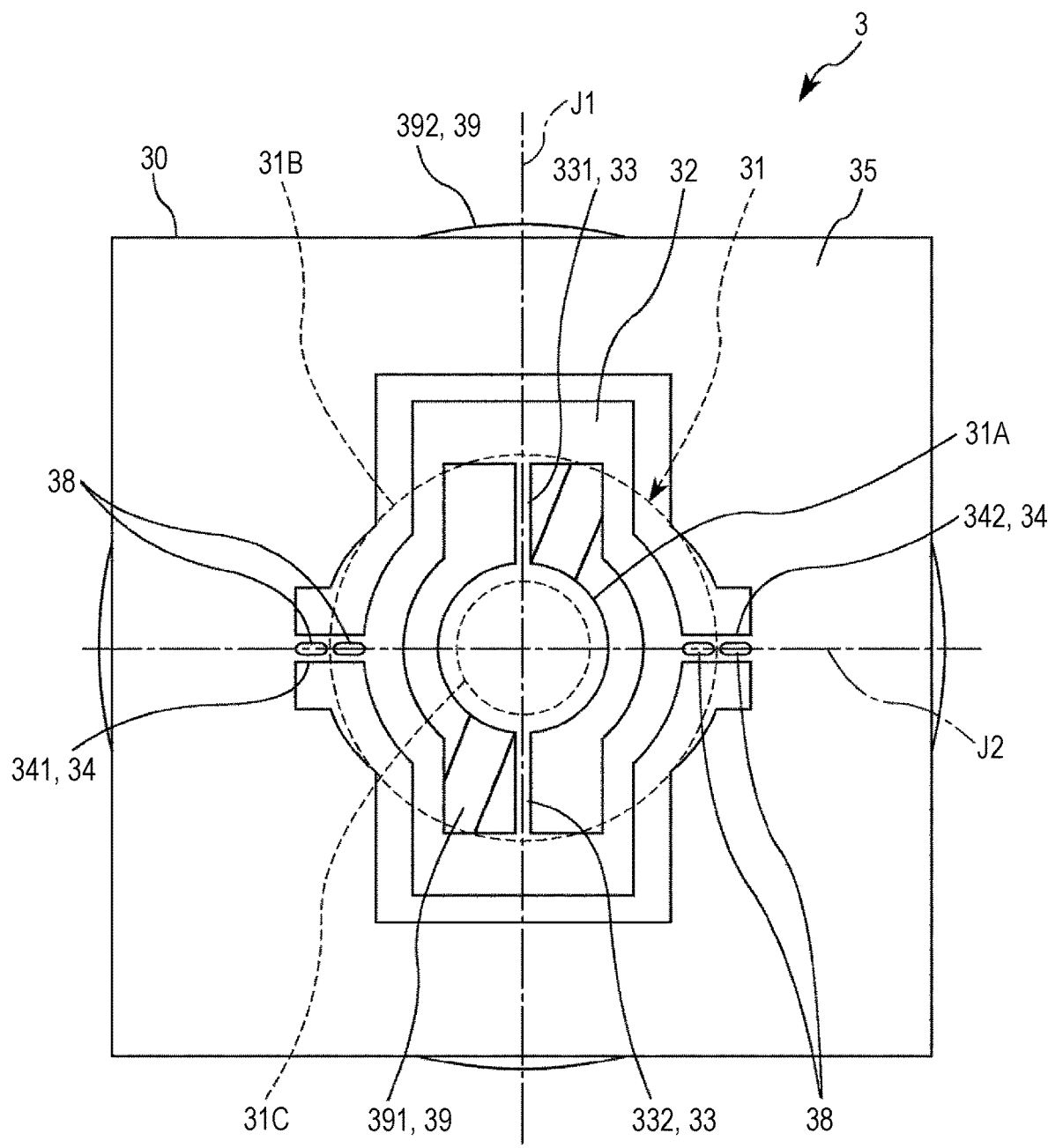
FIG. 26 is a plan view that shows a modification example of the optical scanner shown in FIG. 24.

FIG. 24 is a plan view of an optical scanner according to a fourth embodiment of the invention. FIG. 25 is a cross-sectional view taken along line XXV-XXV in FIG. 24. FIG. 26 is a plan view that shows a modification example of the optical scanner shown in FIG. 24.

Hereinafter, an optical scanner of the fourth embodiment will be described focusing on the differences from the above-mentioned embodiments, and the description of like matters will be omitted.

Other than the fact that the configuration of the first movable portion is different, the optical scanner according to the fourth embodiment of the invention is substantially similar to that of the above-mentioned first embodiment.

Additionally, similar configurations to those of the above-mentioned embodiments are given identical reference symbols.

As shown in FIGS. 24 and 25, the first movable portion 31 has a base portion 31A to which the first axis portion 33 is connected, a plate form mirror holding portion 31B that is disposed separated from the base portion 31A in a plate thickness direction, and a columnar coupling portion 31C that is positioned between the base portion 31A and the mirror holding portion 31B and couples the two components. In addition, the mirror holding portion 31B is provided overlapping with the base portion 31A, the first axis portion 33, the second movable portion 32, and the second axis portion 34 when viewed in a planar manner. Further, the permanent magnet 391 is provided on the lower surface of the base portion 31A, and the light reflecting portion 311 is provided on the upper surface of the mirror holding portion 31B.

According to such a configuration, it is possible to exhibit the following effects. That is, it is possible to decrease the size of the base portion 31A relative to the first movable portion 31 of the above-mentioned first embodiment by an extent equivalent to the amount of the light reflecting portion 311 that need not be provided, and therefore, it is possible to decrease the planar surface size of the structural body 30 by that extent. In addition, since the mirror holding portion 31B is separated from the second movable portion 32 in the plate thickness direction, it is possible to increase the size of the mirror holding portion 31B without inhibiting oscillation of the second movable portion 32, and therefore, it is possible to increase the size of the light reflecting portion 311 by that extent. In this manner, according to the present embodiment, it is possible to achieve miniaturization of the optical scanner 3 while increasing the size of the light reflecting portion 311.

As a result of such a fourth embodiment, it is also possible to exhibit a similar effect to that of the above-mentioned first embodiment.

Additionally, in the present embodiment, the mirror holding portion 31B is provided overlapping with the entire area of the second axis portion 34 when viewed in a planar manner, and for example, as shown in FIG. 26, the mirror holding portion 31B may overlap with a portion of the second axis portion 34 when viewed in a planar manner, and the elastic portions 38 may be exposed on the outer side of the mirror holding portion 31B. In this case, it is preferable that at least the elastic portions 38, which are exposed on the outer side of the mirror holding portion 31B, be configured so as to be unlikely to reflect the rendering laser LL by configuring so to be black as a result of incorporating chromium (Cr), carbon black, or the like.

Fifth Embodiment

Next, a head-up display of the invention will be described.

Figure 27:
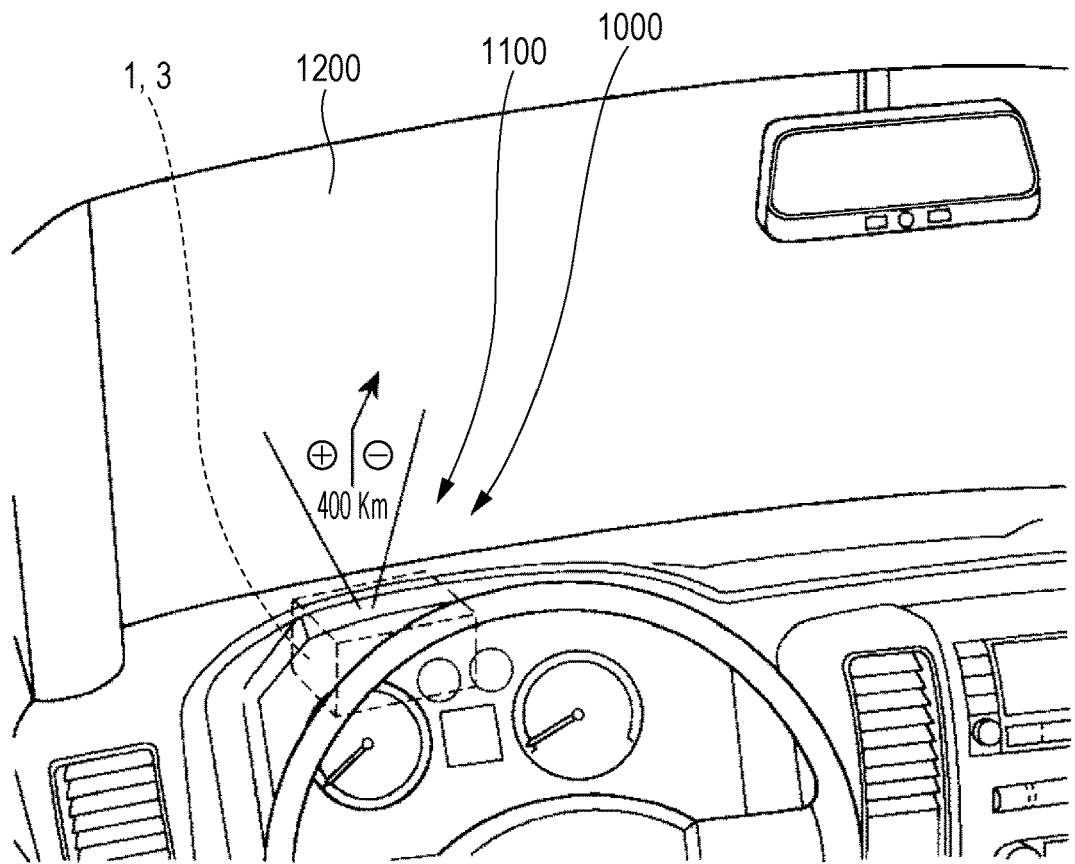
FIG. 27 is a perspective view that shows a head-up display according to a fifth embodiment.

FIG. 27 is a perspective view that shows a head-up display according to a fifth embodiment.

As shown in FIG. 27, in a head-up display system 1000, the image display device 1 is mounted on a dashboard of an automobile so as to configure a head-up display 1100. As a result of the head-up display 1100, for example, it is possible to display a predetermined image such as a guide display to a destination, for example, on a front glass 1200. Additionally, the head-up display system 1000 is not limited to an automobile, and for example, can be applied to an aircraft, a ship, or the like.

Such a head-up display 1100 has the image display device 1 (the optical scanner 3). Therefore, it is possible to benefit from the effect of the above-mentioned optical scanner 3, and therefore, a head-up display 1100 having high reliability is obtained.

Sixth Embodiment

Next, a head-mounted display of the invention will be described.

Figure 28:
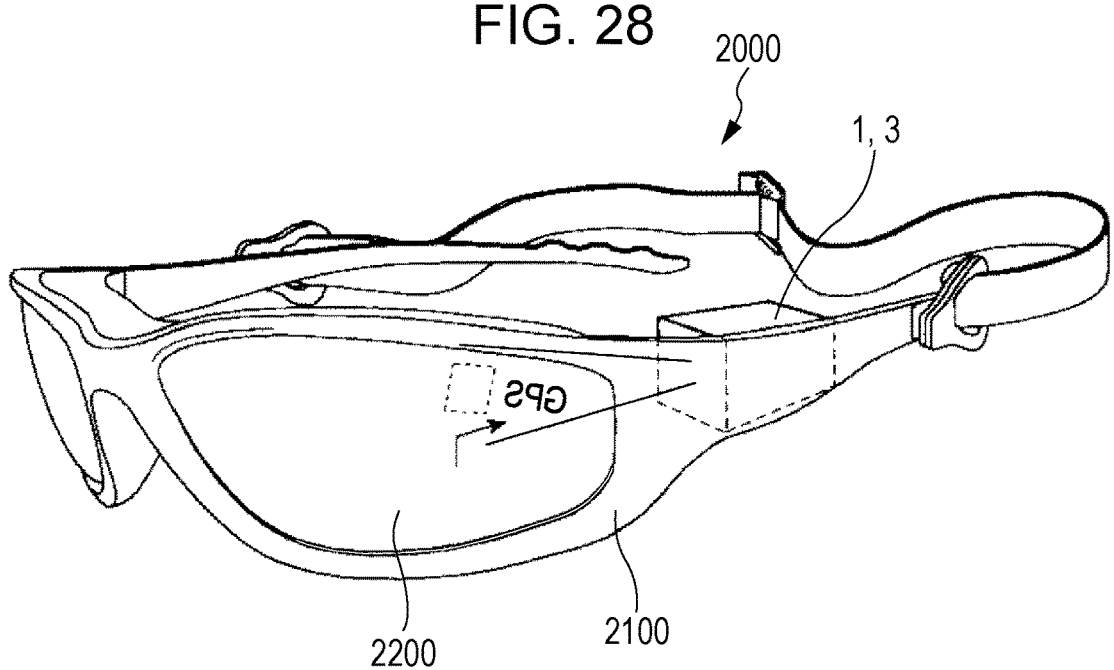
FIG. 28 is a perspective view that shows a head-mounted display according to a sixth embodiment.

FIG. 28 is a perspective view that shows a head-mounted display according to a sixth embodiment.

As shown in FIG. 28, a head-mounted display 2000 has the image display device 1 (the optical scanner 3) and a frame 2100 equipped with the image display device 1 (the optical scanner 3) and worn on the head portion of an observer. Further, as a result of the image display device 1, a predetermined image to be visually recognized by one eye is displayed on a display portion (a light reflecting layer material) 2200 provided in a location, which is ordinarily a lens, of the frame 2100.

The display portion 2200 may be transparent, or may be opaque. In a case in which the display portion 2200 is transparent, use by overlapping information from the image display device 1 with information from the real world is possible. In addition, the display portion 2200 may reflect at least a portion of incident light, and for example, it is possible to use a half mirror, or the like.

Such a head-mounted display 2000 has the image display device 1 (the optical scanner 3). Therefore, it is possible to benefit from the effect of the above-mentioned optical scanner 3, and therefore, a head-mounted display 2000 having high reliability is obtained. Additionally, the configuration of the head-mounted display 2000 is not particularly limited, and for example, two image display devices 1 may be provided in the head-mounted display 2000, and an image to be visually recognized by both eyes may be displayed on the two display portions 2200.

An optical scanner, an image display device, a head-mounted display, and a head-up display of the invention have been described above on the basis of the illustrated embodiments, but the invention is not limited to these embodiments, and the configuration of each portion can be substituted with a portion having an arbitrary configuration that has a similar function. In addition, other arbitrary components may be added to the invention. In addition, each of the above-mentioned embodiments may be combined as appropriate. For example, the second axis portion may have both the through-holes in which the elastic portions are disposed and the recessed portions in which the elastic portions are disposed.

In addition, in the above-mentioned embodiments, a configuration in which the drive mechanism has a permanent magnet and a coil, the permanent magnet is provided in the second movable portion, and the coil is provided so as to face the permanent magnet is described, but conversely, the coil may be provided in the second movable portion and the permanent magnet may be provided so as to face the coil.

In addition, in the above-mentioned embodiments, a configuration in which a plurality of the holes (the through-holes or the bottomed-holes) are provided in each second movable beam portion of the second axis portion and the elastic portion is disposed in all of the holes (all of the holes are filled with the elastic portion) is described, but as long as the elastic portion is disposed in at least one hole, there may be holes in which the elastic portion is not disposed. In addition, the elastic portion may be disposed so as to fill up the entire area of the holes, or the elastic portion may be disposed so as to fill up a portion of the holes. That is, there may be an air space (a region) inside the holes in which the elastic portion is not present.

The entire disclosure of Japanese Patent Application No. 2016-192978, filed Sep. 30, 2016 is expressly incorporated by reference herein.

What is claimed is:

1. An optical scanner comprising:
   a first movable portion provided with a light reflecting portion that has a light reflecting property;
   a second movable portion in which the first movable portion is positioned on an inner side;
   a first axis portion that connects the first movable portion and the second movable portion to one another and oscillatably supports the first movable portion around a first axis;
   a second axis portion that is connected to the second movable portion and oscillatably supports the second movable portion around a second axis that intersects the first axis; and
   a plurality of elastic portions provided in the second axis portion,
   wherein the second axis portion has a plurality of holes and an elastic portion of the plurality of elastic portions is disposed in a respective hole of the plurality of holes,
   wherein the plurality of elastic portions and the second axis portion are separate pieces of structure and the plurality of elastic portions and the second axis portion are connected to each other,
   wherein the second axis portion includes a pair of movable beam portions respectively having two holes of the plurality of holes, the pair of movable beam portions are positioned along the second axis and are separated from each other by the second movable portion,
   wherein the plurality of elastic portions includes two elastic portions for each movable beam portion of the pair of movable beam portions, the two elastic portions are respectively disposed in the two holes of the plurality of holes with the two elastic portions axially separated from each other by the movable beam portion such that the two elastic portions do not axially overlap along the second axis, and
   wherein only the second axis portion, and not the first axis portion, includes an elastic portion of the plurality of elastic portions.

2. The optical scanner according to claim 1,
   wherein the plurality of through holes are a through-hole or a bottomed-hole.

3. An image display device comprising the optical scanner according to claim 2.

4. A head-mounted display comprising:
   the optical scanner according to claim 2; and
   a frame equipped with the optical scanner and worn on a head portion of an observer.

5. The optical scanner according to claim 1,
   wherein the Young's modulus of the plurality of elastic portions is less than the Young's modulus of the second axis portion.

6. An image display device comprising the optical scanner according to claim 5.

7. The optical scanner according to claim 1,
   wherein the Young's modulus of the plurality of elastic portions is 10 MPa to 100 MPa.

8. An image display device comprising the optical scanner according to claim 7.

9. The optical scanner according to claim 1,
   wherein the constituent material of the plurality of elastic portions includes silicone.

10. An image display device comprising the optical scanner according to claim 9.

11. The optical scanner according to claim 1,
    wherein the first movable portion is located entirely within the second movable portion.

12. An image display device comprising the optical scanner according to claim 11.

13. The optical scanner according to claim 1,
    wherein the first movable portion oscillates in resonance around the first axis, and
    the second movable portion oscillates in non-resonance around the second axis.

14. An image display device comprising the optical scanner according to claim 13.

15. An image display device comprising the optical scanner according to claim 1.

16. A head-mounted display comprising:
    the optical scanner according to claim 1; and
    a frame equipped with the optical scanner and worn on a head portion of an observer.

17. A head-up display comprising the optical scanner according to claim 1.

18. A method for manufacturing an optical scanner having a first movable portion provided with a light reflecting portion that has a light reflecting property, a second movable portion in which the first movable portion is positioned on an inner side, a first axis portion that connects the first movable portion and the second movable portion to one another and oscillatably supports the first movable portion around a first axis, a second axis portion that is connected to the second movable portion and oscillatably supports the second movable portion around a second axis that intersects the first axis, and an elastic portion provided in a hole of the second axis portion, the method comprising:
    forming a structural body that includes the first movable portion, the second movable portion, the first axis portion, the second axis portion, and the hole;
    forming the light reflecting portion; and
    coating the structural body with a constituent material of the elastic portion via a mask having an opening portion that corresponds to the hole by using a spray coating technique.

19. The method for manufacturing an optical scanner according to claim 18,
    wherein the opening portion of the mask is an opening that corresponds to at least a section of the second axis portion and the second movable portion, and
    the constituent material includes a black pigment.

20. The method for manufacturing an optical scanner according to claim 19,
    wherein the structural body is heated in the coating.

* * * * *